United States Patent [19]

Israelsen et al.

[11] Patent Number: 5,231,485
[45] Date of Patent: Jul. 27, 1993

[54] METHOD AND APPARATUS FOR TRANSFORMING BETWEEN FIXED-RATE VECTOR QUANTIZED DATA AND VARIABLE RATE VECTOR QUANTIZED DATA

[75] Inventors: Paul D. Israelsen, North Logan, Utah; Keith Lucas, Richmond Hill, Canada

[73] Assignee: Scientific-Atlanta, Inc., Atlanta, Ga.

[21] Appl. No.: 794,491

[22] Filed: Nov. 19, 1991

[51] Int. Cl.$^5$ .................... H04N 7/13; H04N 7/133; H04N 7/137
[52] U.S. Cl. .................... 358/133; 341/67; 358/86; 358/135; 358/136
[58] Field of Search .................... 358/86, 133, 135, 136, 358/138, 105; 341/67

[56] References Cited

U.S. PATENT DOCUMENTS

| | | | |
|---|---|---|---|
| 4,558,350 | 12/1985 | Murakami | 358/21 |
| 4,560,977 | 12/1985 | Murakami et al. | 341/118 |
| 4,851,906 | 7/1989 | Koga | 358/133 |
| 4,878,230 | 10/1989 | Murakami | 358/133 |
| 4,951,139 | 8/1990 | Hamilton et al. | 358/13 |
| 4,954,892 | 9/1990 | Asai et al. | 358/133 |
| 4,979,039 | 12/1990 | Kisor et al. | 358/133 |
| 5,008,747 | 4/1991 | Carr et al. | 358/136 |
| 5,010,401 | 4/1991 | Murakami et al. | 358/136 |
| 5,021,971 | 6/1991 | Lindsay | 395/2 |
| 5,067,152 | 11/1991 | Kisor et al. | 380/10 |
| 5,068,723 | 11/1991 | Dixit et al. | 358/133 |
| 5,109,451 | 4/1992 | Aono | 358/133 |
| 5,136,290 | 8/1992 | Bond | 341/67 |

OTHER PUBLICATIONS

"Vector Quantization of Digital Images", Baker, Richard L., Stanford University—University Microfilms International, *UMI Dissertation Information Service*, (Copyright, 1984).

"Vector Quantization", Gray, Robert M., *The Institute of Electrical and Electronics Engineers, Inc.*, ASSP Mag., vol. 1, pp. 4–29, Apr. 1984.

"Variable Rate Vector Quantization of Images", Riskin, Eve A., Dissertation submitted to the Dept. of Electrical Engineering—Stanford University, May 1990.

"Interpolative Vector Quantization of Color Images", Hang, Hsueh-Ming and Haskell, Barry G., *IEEE Transactions on Communications*, vol. 36, No. 4, Apr. 1988.

U.S. Patent Application Serial No. 365,940 entitled "Method and Apparatus for Data Compression with Reduced Distortion" Filed: Jun. 13, 1989.

U.S. Patent Application Serial No. 359,496 entitled "Frame-to-Frame Compression of Vector Quantized Signals and Other Post-Processing", Filed: May 31, 1989.

"Image Compression Using Adaptive Vector Quantization", Goldberg, M., Boucher, P. et al., *IEEE Trans. Commun.*, vol. COM-34, pp. 180–187, Feb. 1986.

"A Finite State/Frame Difference Interpolative Vector Quantizer for Low Rate Image Sequence Coding", Shen, Hsiao-hui, et al., *Proc. IEEE Int. Conf. Acoust., Speech, Signal Processing*, vol. 2, pp. 1188–1191, Apr. (1988).

"Variable-Rate Multi-Stage Vector Quantization For (List continued on next page.)

*Primary Examiner*—Howard W. Britton
*Attorney, Agent, or Firm*—Woodcock Washburn Kurtz Mackiewicz & Norris

[57] ABSTRACT

A method and apparatus is disclosed wherein fixed rate vector quantized data is transmitted from a first location to a second location via a first medium. The fixed rate vector quantized data is received at the second location and transformed to variable rate vector quantized data. Then, the transformed variable rate vector quantized data is transmitted to a third location via a second medium. At the third location, the variable rate vector quantized data may be received, and if desired, transformed back to fixed rate form. A distortion adaptive vector quantization method is employed to transform the fixed rate vector quantization data to variable rate vector quantization data.

53 Claims, 20 Drawing Sheets

OTHER PUBLICATIONS

Image Coding", Ho, Yo-Sung et al., *Dept. of Electrical and Computer Eng.*, University of California, pp. 1156-1159.

"Pruned Tree-Structured Vector Quantization in Image Coding", Riskin, Eve A., et al., *Information Systems Lab.*, Stanford University—Stanford, California.

"Image Compression Methods with Distortion Controlled Capabilities", Markas, T. et al., *Depts. of Elec. Eng. and Computer Science,* Duke University, Durham, NC.

"A Video Encoding System With Conditional Picture--Element Replenishment", Mounts, F. W., *The Bell System Technical Journal,* Sep., 1989, pp. 2545-2554.

"Variable Rate Vector Quantization for Medical Image Compression", Riskin, Eve A., Lookabaugh, T. et al., *IEEE Trans. on Medical Imaging,* vol. 9, No. 3, Sep. 1990.

FIG. 5
| CODEVECTOR | ADDRESS |
|---|---|
| $CV_1$ | $A_1$ |
| $CV_2$ | $A_2$ |
| $CV_3$ | $A_3$ |
| ⋮ | ⋮ |
| $CV_{64}$ | $A_{64}$ |
M
FIG. 9
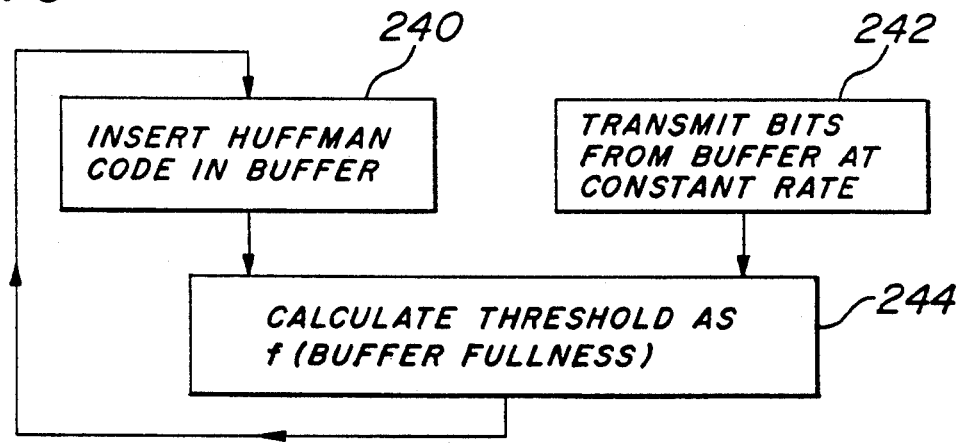
FIG. 10
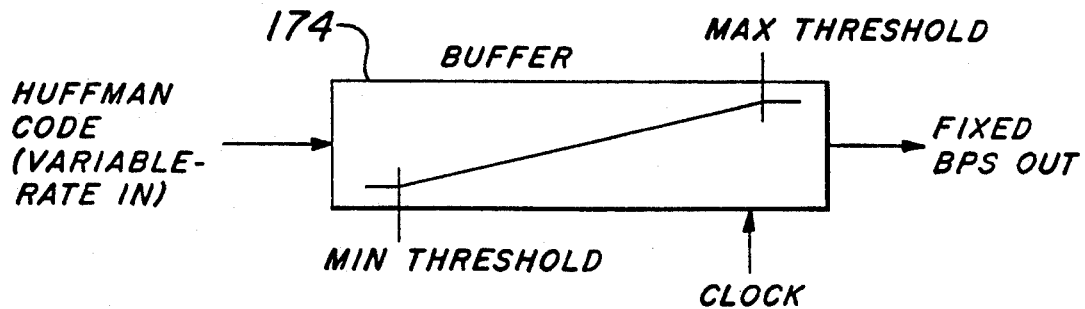

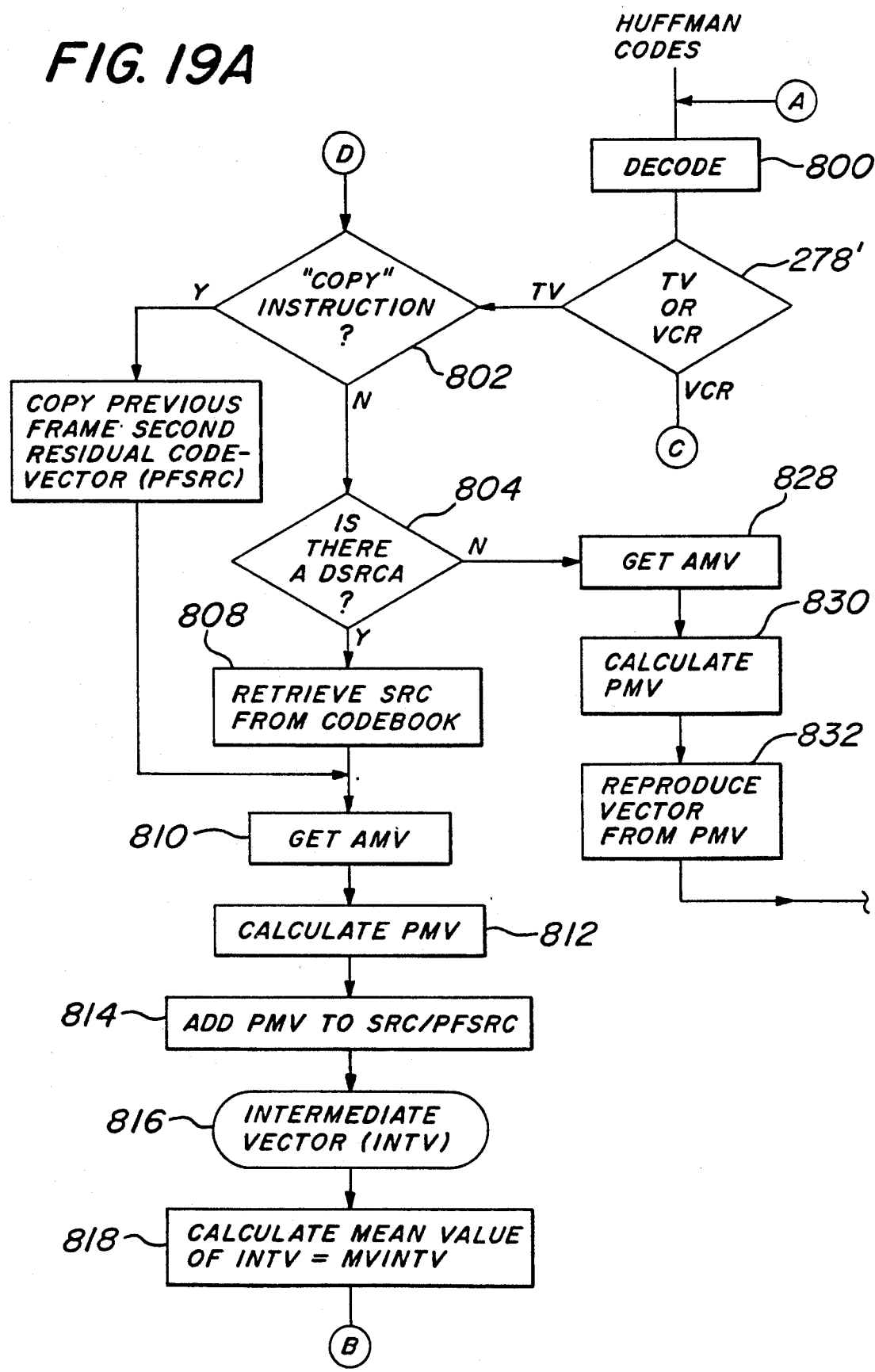

METHOD AND APPARATUS FOR TRANSFORMING BETWEEN FIXED-RATE VECTOR QUANTIZED DATA AND VARIABLE RATE VECTOR QUANTIZED DATA

RELATED APPLICATION DATA

The subject matter of this application is related to the subject matter of the following co-pending patent applications:

U.S. Ser. No. 794,516, entitled "Image Compression Method and Apparatus Employing Distortion Adaptive Tree Search Vector Quantization";

U.S. Ser. No. 794,589, entitled "Image Compression Method and Apparatus Employing Distortion Adaptive Tree Search Vector Quantization With Avoidance of Transmission of Redundant Image Vector Data";

U.S. Ser. No. 794,493, entitled "Progressive Transmission of Vector Quantized Data"; and, U.S. Ser. No. 794,487, entitled "Method and Apparatus for Low Frequency Removal in Vector Quantization."

FIELD OF THE INVENTION

The present invention relates to a vector quantization method, and more particularly, the present invention relates to a method of transforming fixed-rate vector quantized data to variable-rate and back again without the need for re-quantizing the data.

BACKGROUND OF THE INVENTION

The background of the present invention is described herein in the context of pay television systems, such as cable television systems or direct broadcast satellite (DBS) systems, that distribute program material to subscribers, but the invention is by no means limited thereto except as expressly set forth in the accompanying claims.

In a typical cable television system, cable television operators receive much of their program material from remote earth station transmitters via a plurality of geosynchronous orbit satellites. The cable operator selects the program material to be made available to its subscribers by making arrangements with the satellite distributors of that program material. The cable operator receives the transmitted program material at its "cable head-end," where it then re-transmits the data to individual subscribers. Frequently, cable operators also provide their own local programming at the site of the head-end, and further include network broadcasts as well.

In a DBS system, individual subscribers are provided with their own satellite receiver. Each subscriber establishes a down-link with the broadcasting satellite directly. Thus, there is no need, as with cable systems, for re-transmission from a cable head-end.

Typically, in both types of systems (cable and DBS), the program material (both video and audio) is originally in analog form. Conventional transmission techniques place substantial limitations on the maximum number of viewer channels that can be transmitted over any given transponder on a satellite since each channel requires a minimum bandwidth to avoid noticeable degradation and the total number of channels that can be transmitted over a given satellite transponder is limited by the bandwidth of each signal, and of the transponder. Also, in cable systems, the electrical properties of the coaxial cable limit its bandwidth and therefore place substantial limitations on the number of channels that can be delivered to cable television subscribers using conventional transmission techniques.

As a result of the desire to provide more program channels and/or HDTV to subscribers over existing broadcast bandwidths, the pay television industry has begun to investigate digital image transmission techniques. Although the desire is to minimize the transmission bandwidth of program material, thus allowing more channels to be transmitted over an existing broadcast bandwidth, digital image transmission further offers the advantage that digital data can be processed at both the transmission and reception ends to improve picture quality. Unfortunately, the process of converting the program material from analog form to digital form results in data expansion which increases the transmission bandwidth of the program material rather than decreasing it. Therefore, digital transmission alone does not solve the bandwidth problem, but instead makes it worse. However, through the application of digital data compression techniques, large bandwidth reductions can be achieved.

Data compression techniques minimize the quantity of data required to represent each image. Thus, more program material, or more channels, can be offered over an existing broadcast bandwidth. However, any data compression achieved is offset by the data expansion which occurs during the analog to digital conversion. Therefore, to be practical, the compression technique employed must achieve a compression ratio high enough to provide a net data compression. Digital data compression techniques, such as Huffman encoding and LZW (Lempel, Ziv and Welch) encoding, offer, at best, compression ratios of 2.5 to 1 and do not compensate sufficiently for the data expansion that occurs in converting data from analog to digital form.

In response to the need for high compression ratios, a number of so-called "lossy" compression techniques have been investigated for digital image compression. Unlike the Huffmann and LZW encoding techniques, these "lossy" compression techniques do not provide exact reproduction of the data upon decompression. Thus, some degree of information is lost; hence the label "lossy." One such "lossy" compression technique is called DCT direct cosine transform) data compression. Another method, which, until recently, has been used principally for speech compression, is vector quantization. Vector quantization has shown promise in image compression applications by offering high image compression ratios, while also achieving high fidelity image reproduction at the receiving end. It has been demonstrated, for example, that using vector quantization (hereinafter sometimes referred to as "VQ"), compression ratios as high as 25:1, and even as high as 50:1, can be realized without significant visually perceptible degradation in image reproduction.

Compression of video images by vector quantization initially involves dividing the pixels of each image frame into smaller blocks of pixels, or sub-images, and defining a "vector" from relevant data (such as intensity and/or color) reported by each pixel in the sub-image. The vector (sometimes called an "image vector" or "input image vector") is really nothing more than a matrix of values (intensity and/or color) reported by each pixel in the sub-image. For example, a black and white image of a house might be defined by a 600×600 pixel image, and a 6×4 rectangular patch of pixels, representing, for example, a shadow, or part of a roof line against a light background, might form the subimage from which the vector is constructed. The vector itself might be defined by a plurality of gray scale values representing the intensity reported by each pixel. While a black and white image serves as an example here, vectors might also be formed from red, green, or blue levels of a color image, or from the Y, I and Q components of a color image, or from transform coefficients of an image signal.

Numerous methods exist for manipulating the block, or sub-image, to form a vector. R. M. Gray, "Vector Quantization", *IEEE ASSP Mag.*, pp. 4-29 (April, 1984), describes formation of vectors for monochrome images. E. B. Hilbert, "Cluster Compression Algorithm: A Joint Clustering/Data Compression Concept", Jet Propulsion Laboratory, Pasadena, Calif., Publ. 77-43, describes formation of vectors from the color components of pixels. A. Gersho and B. Ramamurthi, "Image Coding Using Vector Quantization", *Proc. IEEE Int. Conf. Acoust., Speech, Signal Processing*, pp. 428-431 (May, 1982), describes vector formation from the intensity values of spatially contiguous groups of pixels. All of the foregoing references are incorporated herein by reference.

By way of example, a television camera might generate an analog video signal in a raster scan format having 600 scan lines per frame. An analog to digital converter could then digitize the video signal at a sampling rate of 600 samples per scan line, each sample being a pixel. Digital signal processing equipment could then store the digital samples in a 600×600 pixel matrix. The 600×600 pixel matrix could then be organized into smaller blocks, for example 6×4 pixel blocks, and then each block could be converted into an image vector. Each of these image vectors would then be compressed as described below.

In an image vector quantizer, a vector quantization "codebook" is created from training data comprising a representative sample of images which the quantizer is likely to encounter during use. The codebook consists of a memory containing a set of stored "codevectors," each representative of commonly encountered image vectors. For example, one codevector might be a 6×4 pixel solid black patch. Another codevector might have all white pixels in the top three rows, and all black pixels in the bottom three rows. Yet another codevector might have a gradient made up of white pixels in the top row, black pixels in the bottom row, and four rows of pixels in between having shades of gray from light to dark. Typically, a codebook of representative codevectors is generated using an iterative clustering algorithm, such as described in S. P. Lloyd, "Least Squares Optimization in PCM", *Bell Lab. Tech. Note*, (1957) (also found in IEEE Trans. Inform. Theory, Vol. IT-28, pp. 129-137, March (1982); and, J. T. Tou and R. C. Gonzalez, "Pattern Recognition Principles", pp. 94-109, Addison-Wesley, Reading, Mass. (1974). Both of these references are incorporated herein by reference.

Each codevector in the codebook is assigned a unique identification code, sometimes called a label. In practice, the identification codes, or labels, are the memory addresses of the codevectors. (In the appended claims, the term "ID code" is sometimes employed to refer to these labels or addresses). For each input image vector, data compression is achieved by selecting the codevector in the codebook that most closely matches the input image vector, and then transmitting the codebook address of the selected codevector rather than the input image vector. Compression results because generally, the addresses of the selected codevectors are much smaller than the image vectors.

By way of example, the codevector having the solid black patch described above, might be assigned address #1. The codevector having the white pixels in the top half and black pixels in the bottom half might be assigned address #2, and so on for hundreds or thousands of codevectors. When quantizing a full image, a vector quantizer divides the full image frame into a series of image vectors (i.e., from each of the blocks of sub images). For each image vector, the vector quantizer identifies one closely matching codevector. The vector quantizer then generates a new signal made up of the series of labels, or memory addresses where the codevectors were found. For the example of a full image of a house, the vector quantizer would divide the full image into numerous image vectors (from each of the blocks, or sub images). The quantizer might then replace image vectors from shadowed areas with address #1 (the solid black patch), and it might replace the roof line image vectors with address #2 (white in the top half and black in the bottom half). As mentioned above, compression results because, typically, the length of the labels or addresses is much smaller than the size of the codevectors stored in memory. Typically, the addresses are transmitted by any conventional technique so that the image can be reconstructed at the receiver.

Reconstruction of the original full image at the receiver (or at least a very close approximation of the original image) may be accomplished by a device which has a codebook, identical to the codebook at the transmitter end, stored in a memory. The device that performs vector quantization and compression at the transmitter is called an encoder, and the device that performs decompression and image reproduction at the receiving end is called a decoder. The decoder reconstructs (at least an approximation of) the original image by retrieving from the codebook in the decoder the codevectors stored at each received address. Generally, the reconstructed image differs somewhat from the original image because codevectors do not usually precisely match the image vectors. The difference is called "distortion." Increasing the size of the codebook generally decreases the distortion.

Many different techniques for searching a codebook to find the codevector that best matches the image vector have been proposed, but generally the methods can be classified as either a full search technique, or a branching (or tree) search technique. In a full search technique, the vector quantizer sequentially compares an input image vector to each and every codevector in the codebook. The vector quantizer computes a measure of distortion for each codevector and selects the one having the smallest distortion. The full search technique ensures selection of the best match, but involves the maximum number of computational steps. Thus, while distortion can be minimized using a full search technique, it is computationally expensive. Y. Linde, A. Buzo and R. Gray, "An Algorithm For Vector Quantizer Design", *IEEE Transactions on Communications*, Vol. COM-28, No. 1 (January 1980), incorporated herein by reference, describes the full search technique and the computational steps involved in such a search. The full search technique is sometimes called "full search vector quantization" or "full search VQ".

The tree search technique reduces the number of codevectors that must be evaluated (and thus reduces search time), but does not necessarily identify the very best match. Consequently, to maintain a given level of distortion, the tree search technique requires a larger codebook than the full search technique. The tree search technique can be considered as one that searches a sequence of small codebooks, instead of one large codebook. The codebook structure can be depicted as a tree, and each search and decision corresponds to advancing along a branch of the tree to the next level or stage of the tree, starting from the root of the tree. Thus, only the codevectors along certain branches of the tree are searched, thereby reducing the search time. A detailed description of the tree search technique may be found in R. M. Gray and H. Abut, "Full Search and Tree Searched Vector Quantization of Speech Waveforms," *Proc. IEEE Int. Conf Acoust., Speech, Signal Processing*, pp. 593-96 (May 1982), and R. M. Gray and Y. Linde, "Vector Quantization and Predictive Quantizers For Gauss Markov Sources", *IEEE Trans. Comm.*, Vol. COM-30, pp. 381-389 (February 1982), both of which are incorporated herein by reference. The tree search technique is sometimes referred to as "tree-search vector quantization", "tree-search VQ" and "TSVQ." Notwithstanding the larger memory that is required to maintain a given level of distortion, this technique has found favor for compressing dynamic images because it is computationally faster.

Transmission of the VQ data (i.e., the codebook labels or addresses) to a receiver for reconstruction of the image can be either "fixed rate" or "variable rate." Fixed rate transmission occurs when all of the transmitted address data has the same length, and a vector address is transmitted for all vectors in the image. Fixed rate transmission is usually implicated when full search VQ has been employed. Fixed rate transmission may also be implicated when tree search VQ has been employed if the vector quantizer always selects a best match codevector from the same level of the tree (addresses at a given level of the tree have a fixed length). Fixed rate transmission is typically preferred when the VQ data (i.e., the addresses) is to be transmitted over a noisy medium, because variable rate signals are more sensitive to transmission errors, as described hereinafter.

As mentioned, tree structured codebooks can provide fixed rate transmission (by always encoding from the same level of the tree); however, tree-structured codebooks are particularly suited for variable rate transmission. Variable rate transmission occurs when the encoder selects codevectors from different levels of a tree structured codebook; in other words, for a given set of input image vectors, the encoder does not always select codevectors from the same level of the tree. Since the addresses associated with codevectors in higher levels of the tree usually are not as long as addresses associated with codevectors in lower levels of the tree, varying the level from which the codevectors are selected also varies the address length, and thus the length of the transmitted data.

Several techniques are available for implementing variable rate VQ. In one technique, the quantity of compressed data generated by an image depends on the image content. For example, a variable rate VQ system might employ two different vector sizes. A large vector size might be used to describe simple parts of the image, and a small vector size might be used to describe complex parts of the image. The amount of compressed data generated depends on the complexity of the image. Sung Ho and A. Gersho, "Variable Rate Multi-Stage Vector Quantization For Image Coding", University of California, Santa Barbara (1988) (Available as IEEE Publ. No. CH 2561-9 88 0000-1156) teach one such technique. This reference is incorporated herein by reference. A disadvantage of this type of variable rate VQ is that the decoder is always more complex than a fixed rate decoder since the decoder requires a video buffer store to reconstruct the image, whereas a fixed rate decoder does not.

Another variable rate transmission scheme is described in E. A. Riskin, "Variable Rate Vector Quantization of Images", Ph. D. Dissertation—Stanford University, pp. 51 et seq. (May, 1990), incorporated herein by reference. Riskin employs an "unbalanced" tree structured codebook. An "unbalanced" tree structure is simply an incomplete tree; in other words, some branches of the tree may extend to further levels of the tree than other branches. As is common in tree search VQ, Riskin's codebook is searched by advancing from level to level along selected branches. However, since Riskin employs an unbalanced tree, some searches will terminate at higher levels than others because some branches do not extend as far down the tree as others. Encoding will occur at different levels of the tree, thereby achieving variable rate transmission since the address length is a direct function of the level from which a codevector is selected. One disadvantage of this method is that because the branch lengths are fixed, users cannot increase the accuracy by encoding further down the tree if desired; encoding must always stop at the end of a branch, whether it extends to only a first level of the tree or a bottom level.

A more preferable implementation of variable rate VQ is disclosed in commonly assigned, co-pending U.S. application Ser. No. 794,516, filed Nov. 19, 1991, and entitled "Image Compression Method and Apparatus Employing Distortion Adaptive Tree Search Vector Quantization," which is incorporated herein by reference. Rather than employing an "unbalanced" tree, this method employs a "balanced" or full tree-structured codebook (i.e., where each branch extends all the way to the bottom of the tree). Variable rate transmission occurs because for each input vector, the level of the tree at which a matching codevector is selected depends upon whether a measure of distortion between the input vector and the best match codevector at a given level satisfies an adjustable threshold. If the distortion measure is less than the threshold, the codevector at that particular level is selected. However, if the distortion measure is greater than the threshold, then the best match codevector at the next level of the tree is selected, and the process is repeated until the distortion measure is less than the threshold, c · until the last level of the tree has been reached. Different input vectors will be encoded at different levels of the tree, and therefore, variable rate transmission is achieved.

Generally speaking, variable rate transmission offers the advantage that the average rate at which VQ data is transmitted is less than the rate that would be experienced if fixed rate transmission were employed for the same image at the same distortion level. In the context of pay television systems, this advantage can be significant, since it can represent a much greater increase in the number of channels that can be carried over existing media (such as satellite and cable) than would be realized if fixed rate transmission were employed. As mentioned above, however, variable rate transmission is more susceptible to transmission errors than fixed rate transmission. Errors in variable rate transmissions make it difficult to parse the variable length addresses at the receiving end. A single uncorrected error can cause a relatively long sequence of data bits to be lost. Conversely, in fixed rate transmission, a single error typically affects only a single vector address.

The error rate in a given transmission is highly dependent on the transmission medium. For example, satellite transmissions are more susceptible to error than are coaxial cable transmissions. This is particularly significant in the context of pay television systems where cable operators receive program material via satellite and retransmit the material to subscribers via coaxial cable. Because satellite transmissions are notoriously noisy, pay television systems would benefit from the use of fixed rate transmission over the satellite. Cable operators, however, would rather employ variable rate transmission because of the higher compression ratios that can be achieved. Furthermore, because magnetic storage media are also notoriously noisy, subscribers wishing to record program material on a VCR can achieve a higher fidelity recording with fixed rate data. Thus, subscribers will want to transform the variable rate data back to fixed rate.

One possible solution for cable operators is to receive the fixed rate transmissions at a cable head-end; decode the information to reproduce the compressed images, and then perform variable rate vector quantization on the reproduced images for transmission to subscribers. This solution is disadvantageous, because vector quantization is performed twice (fixed rate at the source; variable rate at the cable head-end). Each time vector quantization is performed, more distortion is introduced. Furthermore, the cable operator must invest in a costly variable rate vector quantizer. Subscribers wishing to record program material on a VCR at a fixed rate.

Therefore, there is a need for a method of transforming fixed rate vector quantized data to variable rate and back again without the need for re-quantizing the data. Such a method would be particularly advantageous in the context of pay television systems since cable operators could receive fixed rate data over the satellite, transform the data to variable rate, and transmit the variable rate data to subscribers. Subscribers could then easily transform the variable rate data to fixed rate for recording on a VCR. The method and apparatus of the present invention satisfies this need.

SUMMARY OF THE INVENTION

A method according to the present invention comprises the step of first transmitting fixed-rate vector quantized data from a first location to a second location via a first medium. The fixed-rate vector quantized data is received at the second location and transformed to variable-rate vector quantized data. Thereafter, the transformed variable-rate vector quantized data is transmitted to a third location via a second medium. At the third location, the variable-rate vector quantized data may be received, and if desired, transformed back to fixed-rate vector quantized data for storage on magnetic media at the third location.

As embodied in a pay television system, the first location is a transmitter location of television signals, the second location is a cable-head end, and the third location is a receiver location of television signals. Additionally, the first medium is a satellite communications link and the second medium is a cable television distribution system.

According to one embodiment of the method of the present invention, image data to be transmitted is received at a transmitter location and converted to a plurality of multi-dimensional input vectors. A vector quantization encoder is provided at the transmitter location of the type that employs a first tree structured codebook to vector quantize the input vectors and sequentially transmit vector quantized data for each of the input vectors. The first codebook has a plurality of levels of codevectors, each codevector being representative of a possible input vector. The codevectors at each successive level represent possible input vectors with greater accuracy than codevectors at a preceding level, and each codevector has an associated address. The length of each codevector address corresponds to the level of the codevector in the codebook. Accordingly, codevectors at a same level of the codebook have the same length and the lengths increase with each successive level.

The encoder processes one of the input vectors by calculating its mean value and subtracting the mean value from the input vector. The processed input vector is a first residual vector. Thereafter, the encoder selects a codevector from the Nth level of the first codebook that most closely resembles the residual vector. The address of the selected residual codevector has a length of M bits.

The encoder transmits, to an intermediate location via a first medium, an indication of the address associated with the selected residual codevector and the mean value of the input vector. This process is then repeated for each other input vector. A plurality of the transmitted indications represent fixed-rate vector quantized data.

A second tree structured vector quantization codebook, substantially identical to the first codebook, is provided at the intermediate location. At the intermediate location, indications transmitted from the transmitter location are received and from each received indication, the residual codevector address and mean value are obtained. Next, the codevector residing at the obtained residual codevector address (RCA) is retrieved from the Nth level of the second codebook to obtain a substantially identical representation of the residual codevector selected from the first codebook at the transmitter. A measure of difference is then obtained between the retrieved residual codevector and the mean value. If the measure of difference is less than a threshold, then the mean value only is inserted into a FIFO buffer for transmission to at least one reception site.

If, however, it was determined that the measure of difference between the retrieved residual codevector and the mean value was greater than the threshold, then the obtained RCA is transformed to a derivative address having a length ranging from 1 to M bits as follows: i) an initial level of the second codebook is selected and a currently selected level thereof is defined as the initial level; ii) a portion of the obtained RCA is selected having a length ranging from 1 to (M−1) bits and being suitable for addressing a codevector in the currently selected level of the second codebook, then a current codevector address (CCA) is defined as the selected portion; (iii) the codevector residing at the CCA is retrieved from the currently selected level of the second codebook; (iv) a measure of difference is obtained between the retrieved residual codevector (i.e., the codevector previously retrieved with the obtained RCA) and the codevector retrieved in step (iii); (v) if the measure of difference is not greater than a threshold value, then step (viii) below is performed next, but otherwise a next level of the second codebook is selected that succeeds the currently selected level and the currently selected level is redefined as the next level, then the following step (vi) is performed; (vi) if the currently selected level is not the last level of the codebook, then another portion of the obtained RCA is selected having a length ranging from 1 to (M−1) and being suitable for addressing a codevector in the currently selected level (next level), and the CCA is redefined as the newly selected portion and steps (iii) through (v) are repeated, but if the currently selected level is the last level of the codebook, then the following steps are performed; (vii) the CCA is redefined as the obtained RCA; (viii) a derivative address is defined as the current codevector address. The derivative address will have a length ranging from 1 to M bits, and will therefore have a length equal to or less than the obtained RCA which from it was derived. The derivative address is then inserted into the FIFO buffer for transmission.

The process described above is repeated for the residual codevector addresses and mean values obtained from each indication received from the transmitter location, while sequentially transmitting the derivative address and/or mean value data from the FIFO buffer to the reception site(s) via a second medium. Simultaneously, a measure of unused FIFO buffer capacity is maintained, and the threshold is periodically adjusted by automatically increasing the threshold value when the measure of unused FIFO buffer capacity indicates that unused capacity is decreasing, and by automatically decreasing the threshold value when the measure of unused capacity is increasing. Adjustment of the threshold value ensures that the buffer does not empty or overflow as a result of storing variable length data (i.e., the derivative addresses and/or mean values) therein while transmitting the same at a fixed bit rate.

Because the derivative addresses have lengths varying from 1 to M bits, a plurality of the transmitted derivative addresses and/or mean values represent variable-rate VQ data. Thus, the fixed-rate vector quantized data received from the transmitter location has been transformed at the intermediate location to variable-rate vector quantized data.

A decoder is provided at each reception site for receiving the derivative address and/or mean value data and for reconstructing the associated input vectors therefrom to reproduce the image data for display on a television set, or if desired, for receiving the data, which is in variable rate form, and for transforming the variable-rate data back to fixed-rate form for storage on magnetic media at the reception site. Transformation of the variable-rate data back to fixed-rate data is performed as follows: (i) the variable length derivative addresses comprising the variable-rate data are obtained; (2) each derivative address is transformed to an address having a length of S bits, by for example, padding each address with zeros until the address is S bits in length. Thus all the transformed derivative addresses are S bits in length, and a plurality of the transformed derivative addresses represents fixed-rate vector quantized data. The fixed-rate data is then stored on a magnetic medium, such as a VCR tape, at the reception site.

According to a preferred embodiment of the invention, the derivative addresses and/or mean values transmitted from the intermediate location are compressed according to a Huffman encoding technique prior to inserting into the FIFO buffer, and the compressed data is transmitted from the intermediate location.

According to this embodiment of the invention, the decoder at the reception site(s) contains a Huffman decoder for decoding the Huffman encoded derivative addresses and/or mean values transmitted from the intermediate location. The decoder has a tree structured codebook that is substantially identical to the tree structured codebook at the encoder and the codebook at the intermediate location. If the received data is to be displayed on a television set, the decoder employs each received derivative address to retrieve from its codebook the codevector residing at the derivative address to substantially reproduce the residual vector (created at the encoder) that this particular retrieved codevector represents. The received mean value is then added to the representation of the residual vector to produce a substantial representation of the input vector from which the residual vector was created.

Thus, the original input vector was vector quantized in fixed-rate form at the encoder, transmitted to the intermediate location, transformed to variable-rate vector quantized data at the intermediate location, and then transmitted to the reception site and substantially reproduced by the decoder. The reproduced input vector is then employed to substantially re-create the image data for display on a television set at the reception site. Data stored in fixed-rate form on a magnetic medium at the reception site is processed by the decoder in a similar manner when it is desired to "play-back" the stored data.

In a most preferred embodiment of the invention, at the transmitter location, the encoder calculates an actual mean value (AMV) for each input vector (IV) and a processed mean vector (PMV) is computed therefrom. The PMV is a vector that is interpolated from the AMV of the current IV and from the AMV of vectors that surround the current IV in the current frame. The PMV for the current IV is then subtracted from the current IV to obtain a first residual vector (FRV). A mean value of the FRV is determined and subtracted from the FRV to obtain a second residual vector (SRV). The codebook at the encoder contains second residual codevectors (i.e., codevectors corresponding to input vectors with mean values twice removed), whereas the codebook in the previously discussed embodiment contained first residual codevectors. The encoder selects a second residual codevector (SRC) from the Nth level of the codebook that most closely resembles the SRV. An indication of the AMV and the address of the SRC (SRCA) for the current input vector are then transmitted to the intermediate location.

A second tree structured vector quantization codebook, substantially identical to the codebook at the transmitter location, is provided at the intermediate location. Again, this second codebook contains second residual codevectors. At the intermediate location, indications transmitted from the transmitter location for an entire image frame are received and from each received indication, the SRCA and AMV are obtained and stored. Thus, the SRCA and AMV generated at the transmitter for each input vector in a current image frame are received and stored at the intermediate location before further processing takes place. The SRCAs and AMVs for the entire previous frame are stored as well for purposes which will become evident hereinafter. The stored SRCA and AMV for each IV are then processed in order as described below.

A PMV is computed from the AMV of a current IV and from the AMVs surrounding the current IV in the frame. Next, the second residual codevector SRC residing at the obtained SRCA is retrieved from the Nth level of the second codebook to obtain a substantially identical representation of the SRC selected from the first codebook at the transmitter. From the SRC, the PMV and the AMV, a representation of the current IV (RIV) is generated. A first measure of difference is then obtained between the RIV and the PMV. If the first measure of difference is less than the threshold value, then the AMV for the current IV is Huffman encoded and only the Huffman encoded AMV is stored in the FIFO buffer for transmission to the reception site; that is, the SRCA for the current IV is not transformed to a derivative address and, for this IV, only the AMV is transmitted. A code would be appended to the AMV to indicate that the AMV only has been transmitted. The process is then repeated for the next IV.

If, however, the first measure of difference exceeds the threshold value, then a representation of the corresponding previous frame input vector is computed (RPFIV) and a second measure of difference between the RIV (i.e, the representation of the current IV) and the RPFIV is obtained and compared to the threshold. If the second measure of difference is less than the threshold, then the AMV for the current IV is Huffman encoded and inserted into the buffer for transmission to the decoder. A Huffman encoded instruction to copy a corresponding "previous frame second residual codevector" is also stored in the buffer. The process is then repeated for the next IV.

If, however, the second measure of difference exceeded the threshold, then the obtained SRCA is transformed to a derivative second residual codevector address (DSRCA) having a length ranging from 1 to M bits in the same manner as previously described. The DSRCA and the AMV for the current IV are then Huffman encoded and inserted into the buffer for transmission to the reception site(s). The process is then repeated for the next IV.

A plurality of AMVs and/or DSRCAs or "copy previous frame SRC" instructions represent variable-rate vector quantized data.

The threshold is periodically adjusted based upon the unused capacity (i.e., fullness) of the buffer.

A decoder for use with this most preferred embodiment of the encoder preferably has a codebook of SRC's identical to the codebook in the encoder and the codebook at the intermediate location. The decoder receives the Huffman encoded AMV and DSRCA and for each input vector, retrieves the SRC from the codebook residing at the Huffman decoded DSRCA. The decoder also preferably receives and stores all AMV's for a given frame of data. The decoder then calculates a PMV for the retrieved SRC based upon both the AMV received with the current SRCA and the AMV associated with surrounding vectors in accordance with an interpolation technique. The decoder then reproduces a representation of the input vector that resulted in the received SRCA based upon the retrieved SRC, the calculated PMV, and the received AMV. If a "copy previous frame second residual codevector" instruction was received, then the corresponding previous frame second residual codevector (PFSRC) is retrieved from the codebook, rather than the SRC, but the PFSRC is employed in the same manner as the SRC. Thus, the decoder reproduces a representation of the input vector that resulted in transmission of the "copy previous frame second residual codevector" instruction based upon the PFSRC, the calculated PMV, and the received AMV. If only an AMV was received, then the PMV is calculated and the decoder reproduces a representation of the input vector from the PMV only.

At the decoder, the reproduced representations of the input vectors are employed to create a substantial representation of each image frame so that the image may be displayed on a television set at the reception site.

If desired, rather than immediately processing the received DSRCAs and AMVs, received in variable-rate form, for display on a television set, the received data may be transformed to fixed-rate form and stored on a magnetic medium at the reception site in the manner previously described.

Other features of the invention will become evident from the following drawings and specification.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings, an embodiment that is preferred, it being understood, however, that the invention is not limited to the specific methods and instrumentalities disclosed. In the drawings:

FIG. 5 illustrates an exemplary memory for storing a vector quantization codebook;

FIG. 9 is a flowchart illustrating further details of the operation of the apparatus of FIG. 7;

FIG. 10 is a block diagram illustrating further details of the apparatus of FIG. 7 and the method of FIGS. 8A-8B;

FIGS. 19A–19B are a flowchart illustrating the operation of the decoder of FIG. 18.

DESCRIPTION OF THE PREFERRED EMBODIMENT

Before proceeding to the description of the drawings, it should be understood that, although the invention is described herein in the context of broadcasting television signals, such as movies and the like, in a pay television system, the present invention is in no way limited thereto. Rather, the present invention may be employed wherever it is desired to compress and transmit any type of data, including image data, voice data, etc.

Figure 1:
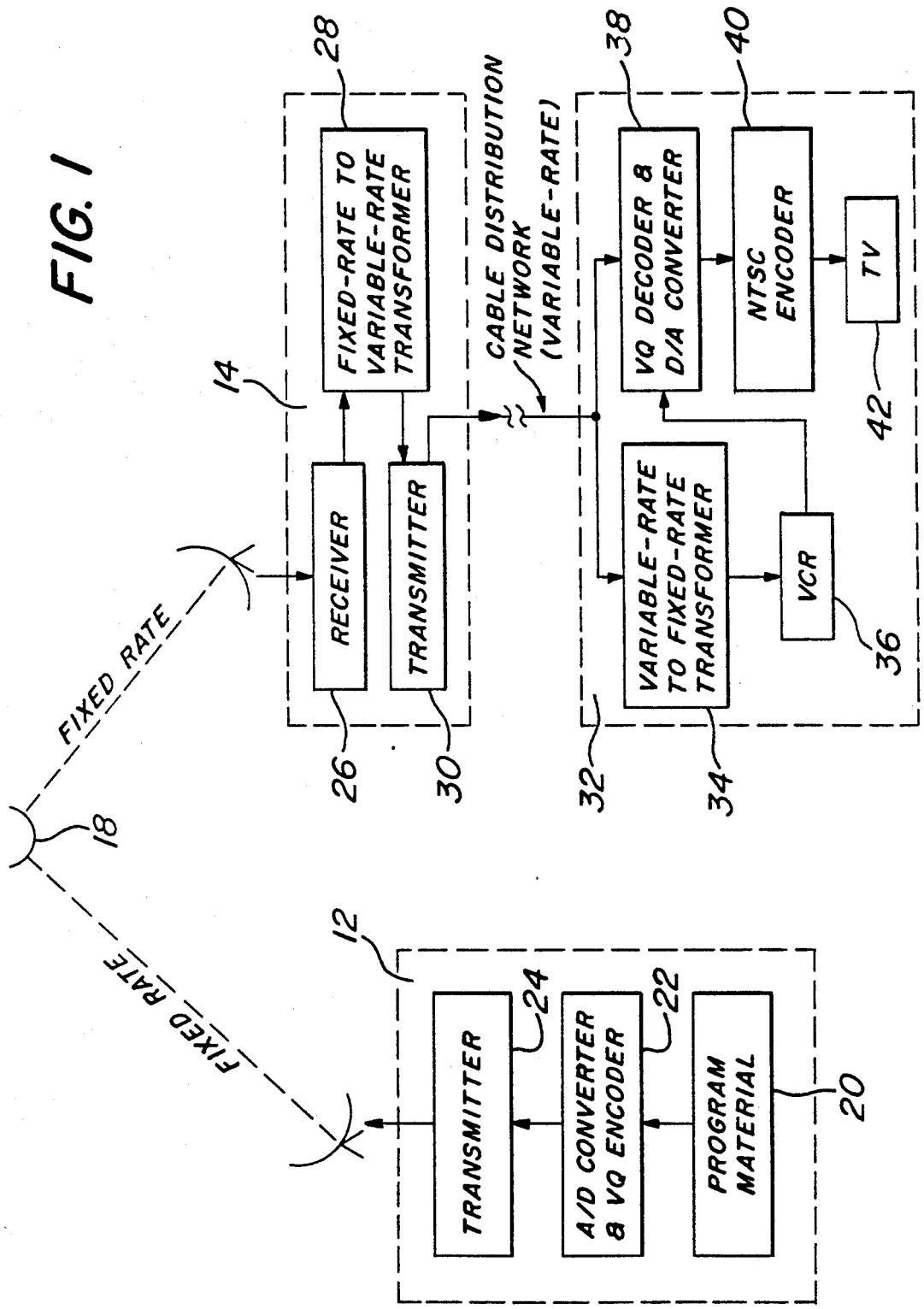
FIG. 1 is a block diagram illustrating an application of the present invention to a pay television system employing satellite communication to transmit program material.

Referring now to the drawings, wherein like numerals indicate like elements, there is illustrated in FIG. 1 an exemplary application of a vector quantization image compression system according to the present invention wherein moving image data (e.g., television signals, such as movies, etc.) is communicated from a transmitter location of pay television signals 12 to a plurality of receiving locations (earth stations) such as 14. Typically, the transmitter location 12 might include a source 20 of program material that supplies movies and the like in analog form to an apparatus (encoder) 22 for digitization and data compression by vector quantization. The apparatus 22 employs a tree structured vector quantization codebook (described hereinafter) for producing the vector quantization data in fixed rate form. The fixed-rate vector quantized data is transmitted to a satellite 18, via transmitter 24, for reception by a plurality of receiving locations (earth stations) such as 14. As mentioned in the background, fixed rate transmission is preferable when transmitting over a noisy medium such as a satellite. Details of a typical apparatus (encoder) 22 may be found in Gray, R. M., "Vector Quantization", *IEEE ASSP Mag.*, Vol. 1, pp. 4,29 (April 1984).

The receiving locations, e.g. location 14, may be the head-end of a cable television distribution system of the type which receives signals from the satellite 18 and distributes them to a plurality of pay television subscribers via coaxial cable. The term "pay television" and "pay television subscriber" is used in the instant specification and accompanying claims to encompass both cable television and direct broadcast satellite applications. The cable head-end installation 14 receives the fixed-rate data transmitted by the station 12 via the receiver 26. Because the data is to be re-transmitted to subscribers via a coaxial cable distribution network, which is a less noisy medium, the cable head-end installation 14 may employ an on-site apparatus 28 for transforming the fixed-rate data to variable rate for transmission over the network via transmitter 30. Details of apparatus 28 will be supplied hereinafter.

By transforming the fixed-rate data to variable-rate prior to transmission over the distribution network, many more channels may be transmitted over the cable to subscribers as could be transmitted over the cable with the same data in fixed-rate form. Alternatively, the installation 14 enables transmission of HDTV signals without sacrificing other channel space.

Subscriber locations, e.g. 32, must be provided with an apparatus (decoder) 38 for decompressing the received variable-rate data and converting the same to analog form. Details of a typical apparatus (decoder) 38 that may be employed in accordance with present invention are described in commonly assigned, co-pending U.S. application Ser. No. 794,516, file Nov. 19, 1991 and entitled "Image Compression Method and Apparatus Employing Distortion Adaptive Tree Search Vector Quantization". See also, Gray, R. M., "Vector Quantization", *IEEE ASSP Mag.*, Vol. 1, pp. 4,29 (April 1984). An apparatus 40 also may be provided at the subscriber location 32 for converting the analog data to NTSC format for display on a television set 42 at the subscriber locale 32. Additionally, some subscribers may wish to record the received image data on a VCR 36 for later display on the television 42. Because compressed data takes up less space on a standard VCR tape cartridge, subscribers may wish to record the data in its compressed form. However, magnetic storage media, such as that found in VCR tape cartridges, is very noisy. Therefore, it is desirable to store compressed data in a fixed rate form. Accordingly, the subscriber location 14 may include a variable-rate to fixed-rate transformer 34 for converting the received variable-rate data back to fixed-rate form prior to recording on the VCR 36. Because the stored data is still encoded, albeit in fixed-rate form, the VCR must be coupled to the apparatus (decoder) 38 for decoding the data during playback. Variable-rate to fixed-rate transformers, such as transformers 34, are well know in the art, and the basic operation of transformer 34 is described hereinafter.

Figure 2:
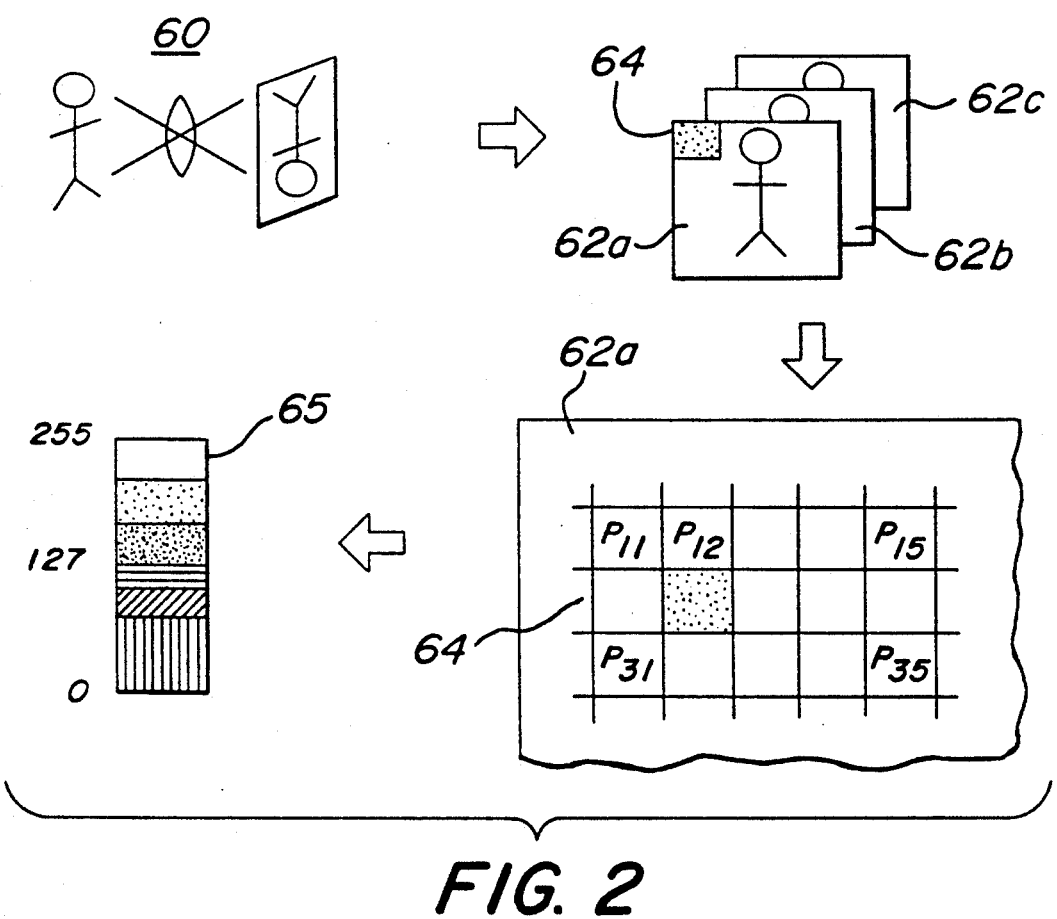
FIG. 2 graphically illustrates the concept of constructing input (image) vectors from pixels of image frames.
Figure 3:
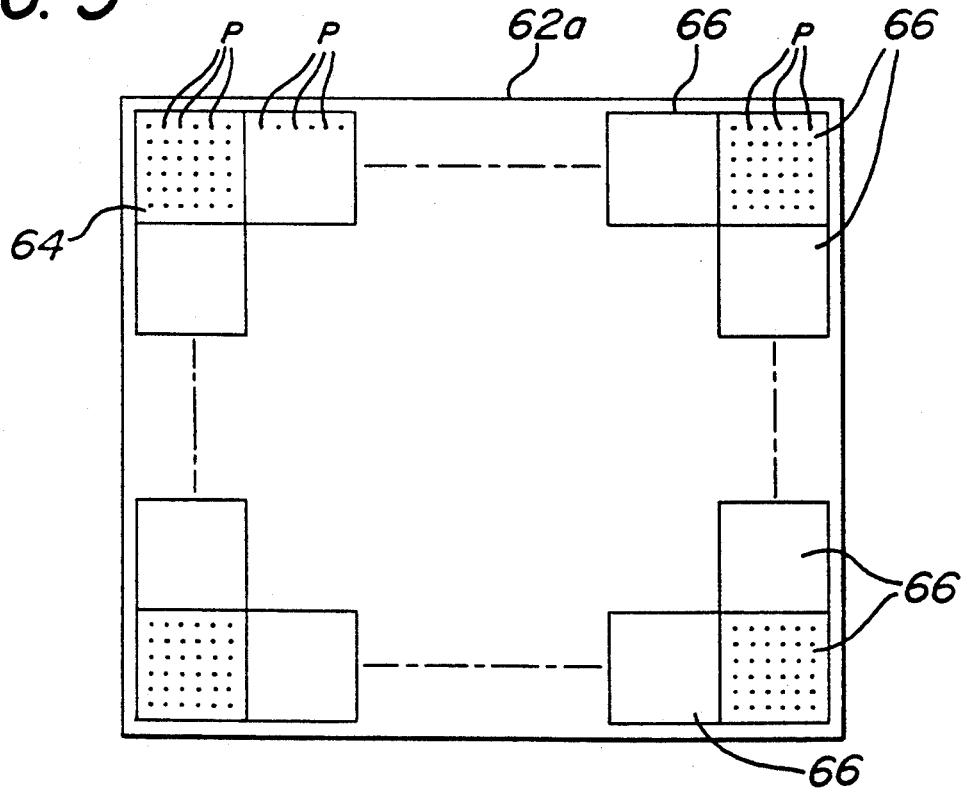
FIG. 3 graphically illustrates an image frame as defined by a plurality of pixels and organized into a plurality of sub-images.

FIG. 2 illustrates the concept of converting moving or dynamic images 60, such as program material 20, into input image vectors for vector quantization. The concept illustrated in FIG. 2 is well known. See, for example, R. L. Baker, "Vector Quantization of Digital Images", Ph.D. Dissertation, Stanford University, Department of Electrical Engineering (1984); Gray, R. M., "Vector Quantization", *IEEE ASSP Mag.*, Vol. 1, pp. 4,29 (April 1984); Goldberg, M., Boucher, P. R. and Shlien, S., "Image Compression Using Adaptive Vector Quantization", *IEEE Comm.*, Vol. COM-34 No. 2 (February 1986); and, Nasrabadi, N. M. and King, R. A., "Image Coding Using Vector Quantization; A Review", *IEEE Comm.*, Vol. 36, No. 8 (August 1988). As shown in FIG. 3, and as is common in the art, each of the temporally spaced image frames 62a, 62b, 62c, etc. representing the moving image 60 is defined by a plurality of pixels P. In the case of a black and white image, each pixel P reports an intensity value, whereas in the case of a color image, each pixel may report luminance and chrominance values, or other values indicative of a color associated with the pixel.

As mentioned in the background section above, in vector quantization of an image frame, e.g., image frame 62a, the pixels P of each image frame are grouped into blocks that define sub-images 66 of each image frame. Each of these blocks, which is a matrix of pixels, defines an input image vector. Thus, in FIG. 2, a sub-image 64 of image frame 62a is represented by the block of pixels $P_{11}, P_{12}, \ldots P_{35}$. This matrix of pixels defines one input image vector for image frame 62a. Image frame 62a, as well as each succeeding image frame 62b, 62c, etc., will usually be represented by a plurality of input image vectors.

As graphically shown at 65 of FIG. 2, the intensity and/or color values reported by each pixel P are digitized (by the A/D converter shown at 22 of FIG. 1). For example, each intensity or color value may be represented by an 8 bit digital word such that 256 intensity and/or color levels are possible for each pixel. Thus, in the case of a black and white image, only one input vector, containing the intensity values reported by each pixel in the block, is required for each block or sub-image. However, in the case of a color image, it may be desirable to provide several input image vectors for each block or sub-image, e.g., one input image vector containing intensity data and another containing color data. Another possibility is that three input image vectors are provided for each block in a color image, one containing Y data, another containing I data, and a third containing Q data. Alternatively, a three-dimensional vector quantization method may be employed to construct a single input vector containing the data in each of these vectors. In vector quantization, each of these input image vectors is then compared to the codevectors stored in the codebook to select a best match codevector for each.

It will be appreciated from the foregoing that, in the case of image data, input vectors will usually be multi-dimensional and usually have at least two dimensions (e.g., the matrix of intensity values shown in FIG. 2). However, there may be instances where input vectors are uni-dimensional, for example, where input vectors are constructed from the intensity values of only single rows or columns of pixels. Input vectors may have more than two dimensions, for example, where input vectors are constructed from pixel blocks of temporally spaced images (known as three-dimensional vector quantization), and/or where data in addition to intensity data (e.g., color) is included in each vector.

As described in the background, each of the input image vectors is compared to the codevectors stored in a VQ codebook to select a best match codevector for each. According to the present invention, the encoder 22 and decoder 38 of FIG. 1 both employ a tree structured (sometimes referred to as "tree search") VQ codebook. The construction and use of tree structured codebooks to perform vector quantization is well known in the art. See, for example, the aforementioned article by R. M. Gray entitled "Vector Quantization", and the aforementioned Ph.D. dissertation of R. L. Baker entitled "Vector Quantization of Digital Images". See also the aforementioned Ph.D. dissertation of E. A. Riskin entitled "Variable Rate Quantization of Images", and, U.S. Pat. No. 4,878,230 of Murakami et al. entitled, "Amplitude Adaptive Vector Quantization System." The aforementioned article by Linde, Buzo and Gray entitled "An Algorithm for Vector Quantizer Design" describes one preferred method for constructing codebooks that may be employed in the practice of the present invention.

As is known to those skilled in the art, a typical tree search VQ codebook comprises a plurality of levels of codevectors arranged in a tree structure wherein each codevector represents a possible input vector. The codevectors at each successive level of the tree usually represent possible input vectors with greater accuracy than codevectors at a preceding level, and successive levels of the tree contain more codevectors than preceding levels. Each codevector has an associated ID code or label which uniquely identifies the codevector and provides a means for accessing the codevector from the codebook. In typical applications, VQ codebooks are stored in a digital electronic memory, and thus the ID codes or labels are the memory addresses of each codevector. As a result of the tree structure, the memory address of each codevector has a length which corresponds to the level of the tree at which the codevector resides. Thus, the memory addresses of codevectors at a same level have the same length, and the length increases with each successive level of codevectors.

Figure 4:
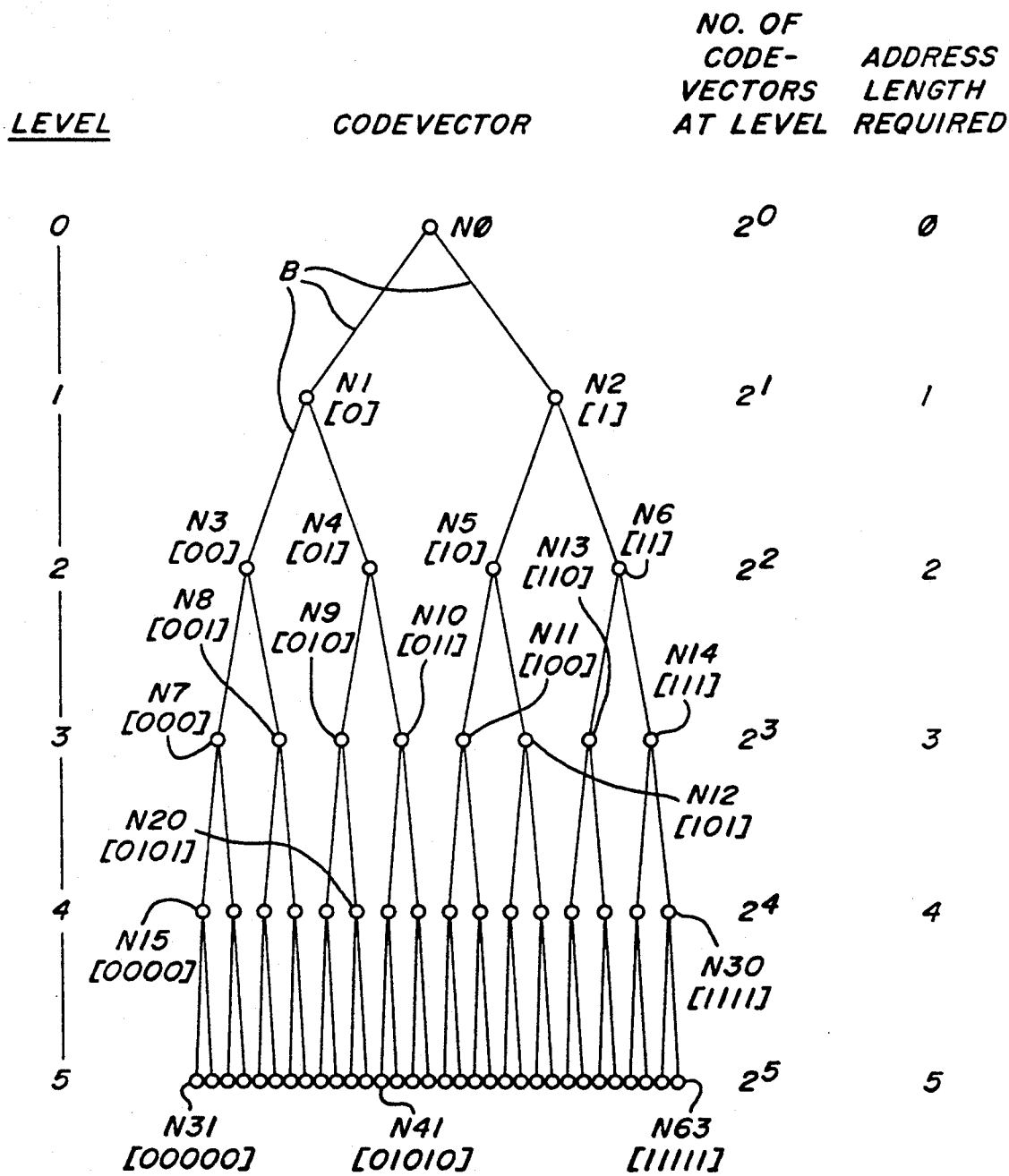
FIG. 4 illustrates the organization of an exemplary tree search VQ codebook that may be employed in accordance with the present invention.

FIG. 4 graphically illustrates the structure of an exemplary tree search VQ codebook that may be employed in the present invention. As shown in the figure, the exemplary tree search VQ codebook comprises a plurality of levels 0-5 of codevectors wherein level 0 is defined by a root node N0 of the tree and subsequent levels are defined by additional nodes N1-N62 that are reached as branches B of the tree are traversed. Each node is, of course, a codevector, so the exemplary codebook of FIG. 4 has 63 codevectors N0-N62. The tree search VQ codebook of FIG. 4 may be stored in an electronic memory. FIG. 5 graphically illustrates an exemplary memory M containing the codevectors CV of a tree search codebook. Each codevector has an associated memory address A.

As mentioned above, in typical tree search codebooks such as the codebook of FIG. 4, the codevectors at successive levels represent possible input vectors with greater accuracy than codevectors at a preceding level. Thus, for example, the codevectors at level 5 of the exemplary tree of FIG. 4 may represent possible input vectors with greater accuracy than the codevectors at level 4, and the codevectors at level 4 may represent possible input vectors with greater accuracy than the codevectors stored at level 3, and so on. Also, each codevector has an associated address. Codevectors higher up in the tree (e.g., level 0 and 1) have shorter addresses than codevectors lower in the tree (e.g., levels 4 and 5), because there are fewer choices in the upper levels than in the lower levels. For example, an address length of 5 bits is required to address the $2^5$ codevectors in level 5, whereas an address length of only 3 bits is required to address one of the $2^5$ codevectors in level 3, etc. For purposes of later discussion and in the drawings, the addresses of some codevectors are indicated in brackets ("[]").

Considering the structure of a tree search codebook in greater detail and referring to the tree search codebook of FIG. 4 as an example, it can be seen that successive levels of the tree search codebook are formed by branches B emanating from each node in a preceding level. Thus for example, from the root node N0, the first level of the tree search codebook of FIG. 4 is formed by the branches to N1 and N2; the second level is formed by the branches from N1 to N3 and N4 and the branches from N2 to N5 and N6. As shown in the Figure, two branches emanate from each node until the bottom level of the tree is reached. It is understood by those skilled in the art that while the tree search codebook of FIG. 4 has two branches emanating from each node, other tree search codebooks may be used in accordance with the present invention that have more branches emanating from each node.

The address length of each codevector depends upon the number of branches emanating from each node as well as the level of the tree at which the codevector resides. In typical applications, VQ codebooks are stored in a digital electronic memory wherein the addresses are binary. In general, then, the length of the binary address of a codevector at a given level (L) can be expressed as:

Address Length = L*k bits, where $k = \log_2 b$ and where b = the number of branches emanating from each node. Thus, for example, in the tree search codebook of FIG. 4, where there are two branches emanating from each node, k is equal to 1, and the codevectors of the first level of the codebook (residing at N1 and N2) require an address length of only 1 bit. The codevectors at each successive level of the tree search codebook of FIG. 4 require 1 additional address bit. The 5th level of the codebook, therefore, requires 5 address bits. Applying the formula above to a tree search codebook having four branches emanating from each node, each successive level of codevectors requires two additional address bits (i.e. $k = 2 = \log_2 4$). Similarly, in a codebook having eight branches emanating from each node, each successive level of codevectors requires three additional address bits, and so on.

With binary addressing, the address of a codevector (node) at a given level of the tree comprises the address of the parent node in the preceding level plus the number of bits necessary to distinguish that codevector from the other codevectors (nodes) having the same parent node. As described above the number of additional bits, k, depends on the number of branches emanating from the parent node and can be expressed as:

$\log_2 b$ bits, where b = the number of branches emanating from the parent node. Thus, for example, referring to the tree search codebook of FIG. 4 wherein two branches emanate from each node, the address of the codevector at N4 is [01] which comprises the address of the codevector at parent node N1 ([0]) plus an additional bit ([1]) to distinguish the codevector at N4 from the codevector at N3 which also has node N1 as a parent. Similarly, for example, the address of the codevector at N9 is [010] which comprises the address of the codevector at parent node N4 ([01]) plus an additional bit ([0]) to distinguish the codevector at N9 from the codevector at N10 which also has node N4 as a parent.

A necessary result of the structure described above is that from the address a codevector at a node in a given level L' of the tree, the address of a codevector at a parent node in a preceding level P can be obtained by selecting the most significant P*k bits of the L' level codevector address. Thus, for example, knowing the address of the codevector at N41 [01010] in the 5th or last level of the tree search codebook of FIG. 4, the address of the codevector at parent node N1 in the first level of the codebook is obtained simply by selecting the 1*1 = 1 (p = 1, k = 1) most significant bit [0] from the address of node N41. Similarly, the address of the codevector at parent node N4 in the second level is obtained by selecting the 2*1 = 2 (p = 2, k = 1) most significant bits [01] of the last level address. The address of the codevector at parent node N9 in the third level is obtained by selecting the 3*1 = 3 (p = 3, k = 1) most significant bits [010] and so on. The significance of this result will become apparent hereinafter.

According to the method of the present invention, fixed-rate vector quantized data is transmitted from a first location to a second location via a first medium. At the second location, the fixed-rate vector quantized data is transformed to variable-rate vector quantized data. The variable-rate VQ data is then transmitted from the second location to a third location via a second medium. At the third location, the variable-rate VQ data may, if desired, be re-transformed to fixed-rate for storage on magnetic media at the third location. As discussed herein in the context of pay television systems, the first location is a transmitter location of television signals (e.g., location 12 of FIG. 1), the second location is an intermediate location such as, for example, a cable head-end (e.g., location 14 of FIG. 1, and the third location is a receiver location of television signals such as, for example, a pay television subscriber (e.g., location 32 of FIG. 1). In such a system, the first medium comprises a satellite communications link, and the second medium comprises a cable television distribution system. As mentioned, although the method and apparatus of the present invention are described herein in the context of such a system, the method and apparatus are in no way limited thereto.

Figure 6:
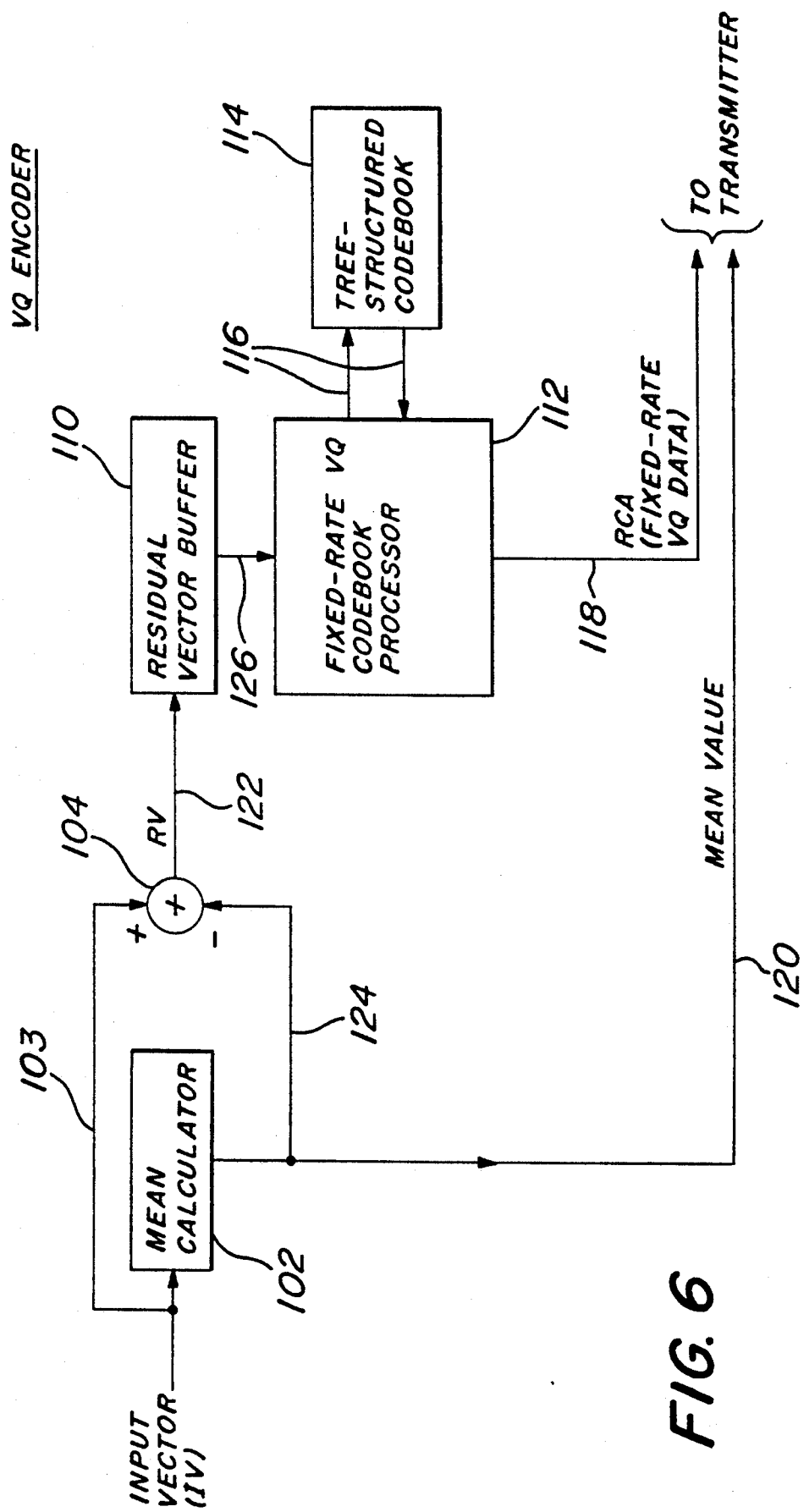
FIG. 6 is a block diagram of an encoder apparatus for use in connection with one embodiment of the method and apparatus of the present invention.

Referring now to FIG. 6, there is illustrated a VQ encoder apparatus 100 for use in connection with one embodiment of the method and apparatus of the present invention. The encoder apparatus 100 may be employed to implement block 22 of FIG. 1. An input vector (IV) is received and supplied to a circuit 102 which computes the mean value of the IV. The mean value is supplied on a line 124 to the "−" input of an adder circuit 104 which also receives on a "+" input, via line 103, the IV itself. The adder circuit 104 subtracts the mean value from the IV to supply, on a line 122, a so-called "residual vector" (RV), which is the IV with its mean value once removed. As will become evident hereinafter, it is the RV that is used for searching the codebook to select a best match codevector. This style of vector quantization, known as mean removed vector quantization (MRVQ), is well known in the art and has numerous advantages. See, for example, the aforementioned article by R. M. Gray entitled "Vector Quantization" and the aforementioned Ph.D. dissertation by R. L. Baker entitled "Vector Quantization of Digital Images". Although the invention is described herein as employing MRVQ, this is simply one preferred embodiment, and the invention is not limited to use of MRVQ, except as may be expressly set forth in the accompanying claims. Rather, if desired, the input vector itself, or some other variant thereof, may be used to carry out the codebook search to select the best match codevector (in the claims, the term "processed input vector" has been employed to cover all such possibilities).

The residual vector (RV), provided on line 122, is stored in a residual vector buffer 110. The RV is provided to a codebook processor 112 via line 126. A preferred circuit for the codebook processor 112 is disclosed in U.S. Pat. No. 5,031,037 entitled "Method and Apparatus for Vector Quantizer Parallel Processing." The codebook processor 112 bi-directionally communicates with a vector quantization codebook 114 (of the type previously described) via a pair of lines 116. In the preferred embodiment, the codebook 114 is a tree structured codebook. The tree structured codebook 114 has a plurality N of levels of codevectors—the Nth level being the last or bottom level. For example, the tree structured codebook 114 may be the exemplary codebook of FIG. 4 which has 5 levels of codevectors with the 5th level being the last or bottom level. As described above, each codevector in the codebook has an associated address with an address length equal to L multiplied by k ("L * k"), where L is the level of the codevector and k is equal to $\log_2 b$, where b is the number of branches emanating from each node in the tree structure. Thus, k is a function of the tree structure.

Using a tree-search technique, the codebook processor 112 compares the RV to the codevectors at successive levels of the codebook and selects from the Nth level a residual codevector (RC) that most closely resembles the RV. The address of the residual codevector (RCA), being from the Nth level, has a length equal to N * k bits. The codebook processor 112 provides the RCA on a line 118 to a transmitter (not shown). The mean value calculated by calculator 102 is also provided to the transmitter via a line 120. The transmitter transmits an indication of the RCA and of the mean value of the IV to an intermediate (second) location (not shown) via a first medium. As mentioned above, in the context of pay television systems, the intermediate location is a cable head-end and the first medium is a satellite communications link.

It is understood that the apparatus 100 processes every input vector in a given image frame. Thus, an indication of an RCA and associated mean value are transmitted for each input vector. Because each RCA will always have the same length (since they are always selected from the bottom level of the codebook), a plurality of the transmitted indications represents fixed-rate vector quantized data.

As described above, in the present embodiment, the codebook 114 is a tree-structured codebook containing N levels of codevectors. Accordingly, the codebook processor 112 employs a tree-search technique to select from the Nth level of the codebook 114 the residual codevector that most closely resembles the residual vector. However, because the codebook processor 112 always selects codevectors from the Nth level of the tree structure, in an alternate embodiment, the codebook 114 may be a full-search codebook containing only the codevectors from the Nth level of a tree-structured codebook. For example, rather than employing the exemplary tree-structured codebook of FIG. 4 which has 5 levels of codevectors, a full-search codebook could be employed that contains only the codevectors from the 5th level of the exemplary tree-structured codebook. In such a case, the codebook processor 112 would employ a full-search technique to choose the codevector most closely resembling the residual vector. The same result is achieved either way; that is, a codevector is selected from the last level of a tree-structured codebook. As is understood by those skilled in the art, however, employing a tree-search technique with a full tree-structured codebook offers the advantage of a faster search.

Figure 7:
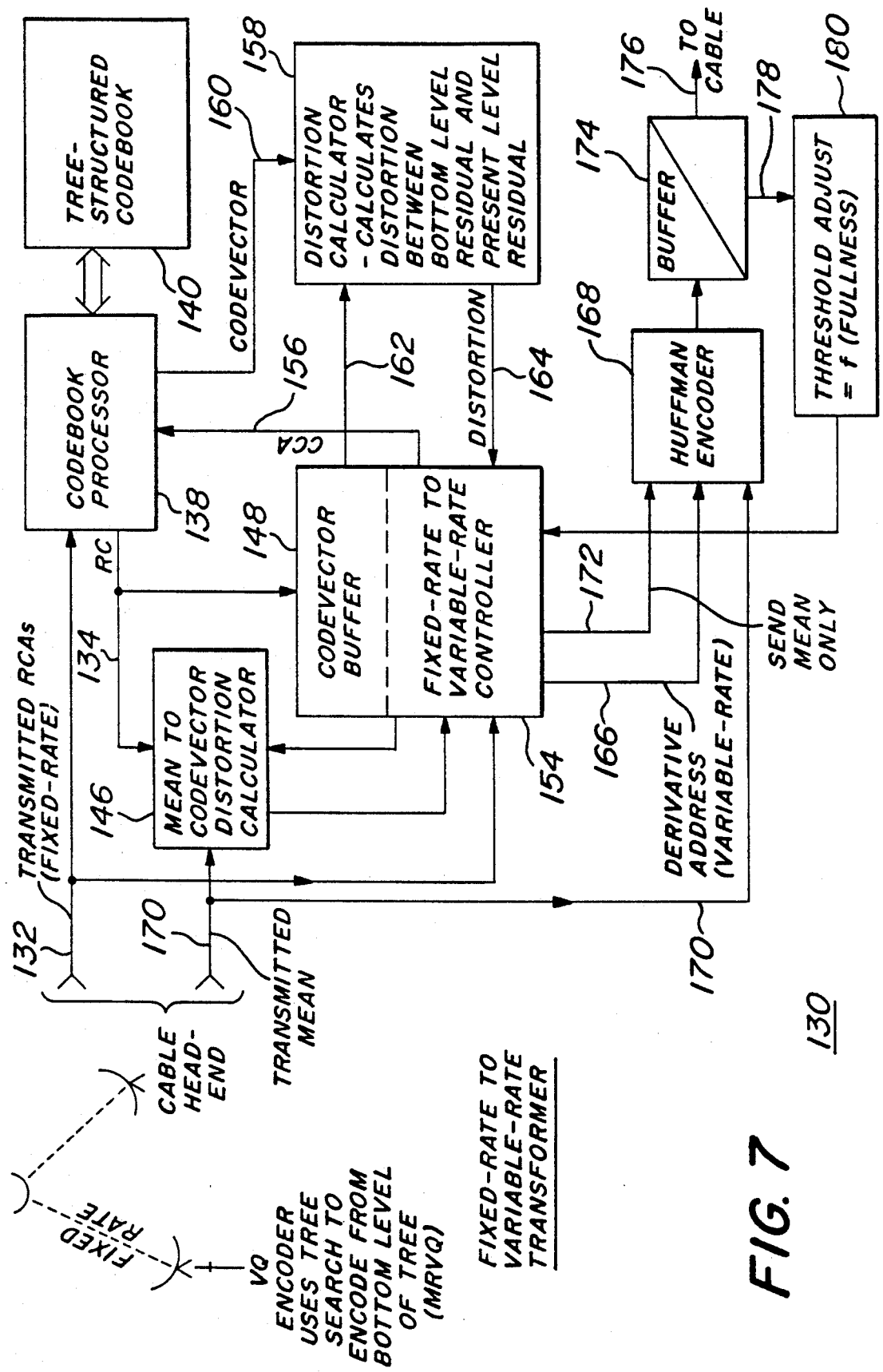
FIG. 7 is a block diagram of one embodiment of a fixed-rate VQ data to variable-rate VQ data transformer in accordance with the present invention.

Referring now to FIG. 7, there is illustrated one embodiment of an apparatus 130 for transforming fixed-rate vector quantized data to variable-rate vector quantized data in accordance with the present invention. The apparatus 130 may be employed to implement block 28 of FIG. 1. As illustrated in FIG. 7, and as described herein, the apparatus 130 is used in connection with the VQ encoder apparatus 100 described above. Although both the apparatus 100 and the apparatus 130 are described herein in the context of pay television systems, the apparatus 100 and 130 are not limited thereto.

The apparatus 130 comprises means (not shown) for receiving indications transmitted from the transmitter location and for obtaining the RCA and the associated mean value from each indication. The receiving means (not shown) may be the receiver 26 of FIG. 1. For each received indication, the obtained RCA is supplied on a line 132 to a codebook processor 138, which bi-directionally communicates with a tree-structured codebook 140. The tree structured codebook 140 is substantially identical to the tree structured codebook 114 of the VQ encoder apparatus 100. The codebook processor 138 retrieves, from the Nth level of the codebook 140, the residual codevector(RC) residing at the obtained RCA and supplies the retrieved RC to one input of a mean value-to-codevector distortion calculator 146 via a line 134. Because the codebooks 114 and 140 are identical, the retrieved RC is identical to the residual codevector selected from the codebook 114 at the encoder 100. The retrieved RC is also supplied via line 134 to a residual codevector buffer 148.

The obtained mean value is supplied to a second input of the calculator 146, via a line 170. Also supplied as an input to the calculator 146, on a line 150, is a threshold value whose magnitude is determined as hereinafter described. The calculator 146 determines whether the difference between the mean value and the retrieved RC is less than or greater than the threshold value. The result of this decision is reported, via line 152, to a fixed-rate to variable-rate controller 154. The controller 154, which functions in accordance with the flowchart of FIGS. 8A and 8B, also receives, via line 132, the obtained RCA. The controller 154 is responsible for transforming the obtained RCA to a derivative address having a length ranging from k to N * k bits.

As will become evident hereinafter, if the difference between the mean value and the retrieved RC is less than the threshold, the controller 154 does not carry out the address transformation for the obtained RCA. (Alternatively, if the difference between the mean value and the retrieved RC is less than the threshold, the obtained RCA could be transformed to a derivative address and the result discarded. This approach offers the advantage that the hardware implementation may be simpler.) On the other hand, if the difference exceeds the threshold, then the controller 154 carries out the address transformation as hereinafter described.

For purposes which will become evident hereinafter, the controller 154 may provide a selected portion of the obtained RCA (which is an N * k bit address) to the codebook processor 138 via a line 156. The selected portion represents an intermediate address and has a length ranging from k to N * k. The codebook processor 138 will retrieve from the codebook 140 the codevector residing at the intermediate address and provide the retrieved intermediate codevector, via a line 160, to a codevector distortion calculator 158. Also provided to the distortion calculator 158, via a line 162, is the retrieved RC stored in the buffer 162. The distortion calculator 158 calculates a measure of distortion between the retrieved RC and the retrieved intermediate codevector. The measure of distortion is supplied to the controller 154 via a line 164. For purposes described hereinafter, the controller 154 compares the measure of distortion to the threshold value and selects another portion of the obtained RCA if the measure of distortion is greater than the threshold. Otherwise, the intermediate address becomes a finally selected portion and the finally selected portion, representing the derivative address, is provided via a line 166 to a Huffman encoder 168.

The obtained mean value is also provided to the Huffmann encoder 168 via line 170. As previously mentioned, however, if the calculator 146 indicates that the measure of difference between the mean value and the retrieved RC is less than the threshold, then the controller 148 does not perform the address transformation. In such a case, the controller 154 indicates this to the Huffmann encoder 168 via a line 172, and the controller 154 does not supply a derivative address to the Huffmann encoder via line 166. Thus, when the measure of difference between the mean value and the retrieved RC is less than the threshold, the apparatus 130 only transmits the mean value to receiving locations. The Huffmann encoder 168 will insert a code to alert receiving locations when a mean value only is being transmitted.

Huffmann encoders are well-known in the art. While many different variations of Huffmann encoders are known, all operate on essentially the same principle. A Huffmann encoder is a lossless data compressor that, using a look-up table, assigns separable compression codes (addresses) based on the statistical probability that a particular entry in the look-up table will be addressed. That is, the greater the probability that a particular entry in the look-up table will be addressed, the shorter the compression code. Thus, the function of the Huffmann encoder 168 is to assign compression codes to each derivative address received on line 166, wherein the compression code assigned to each address received on line 166 has a length that is inversely proportional to a predetermined probability that the codevector associated with that address will be selected from the codebook 140. The Huffmann encoder 168 also assigns compression codes to the mean values supplied to the Huffmann encoder via line 170.

Although a Huffmann encoder has been shown for compressing the mean values and derivative address data, any lossless data compressor may be employed; however, a Huffmann encoder is preferred.

The output of the Huffmann encoder 168 is provided to the input of a first-in first-out (FIFO) buffer 174. A clock serially clocks in the derivative address data from the Huffmann encoder 168 while synchronously transmitting out data stored in the FIFO buffer on output 176. The output 176 of FIG. 7 corresponds to the output of block 28 of FIG. 1.

As previously mentioned, the magnitude of the threshold determines in the first instance whether the obtained RCA will be transformed to a derivative address, and if a transformation is called for, then the magnitude of the threshold also effects the length of the finally selected portion of the obtained RCA, and therefore the length of the derivative address. This threshold is variable according to a measure of "buffer fullness", or unused capacity of the FIFO buffer 174. The measure of buffer fullness is provided on a line 178 to a threshold adjust circuit 180 which is responsive to the measure of buffer fullness to increase or decrease the magnitude of the threshold. Accordingly, when the signal on line 178 indicates that unused buffer capacity is decreasing (as a result of incoming derivative address data filling the buffer faster than it is being transmitted out), the threshold adjust circuit 180 automatically increases the magnitude of the threshold value. Similarly, when the signal on line 178 indicates that unused buffer capacity is increasing (as a result of derivative address data and mean value data being transmitted out faster than the controller 154 is providing it to the buffer), the threshold adjust circuit 180 automatically decreases the magnitude of the threshold value. Co-pending, U.S. patent application Ser. No. 365,940, Filed Jun. 13, 1985, entitled "Method and apparatus for Data Compression With Reduced Distortion" discloses another application of a circuit that employs a measure of buffer fullness to adjust a value.

It will be appreciated that increasing the magnitude of the threshold value will increase the measure of difference that will be permitted between the mean value and the retrieved RC before address transformation is called for. If transformation is performed, an increase in the magnitude of the threshold value will also decrease the average length of the derivative addresses being produced by the controller 154. Decreasing the threshold value will have an opposite effect. It will thus be seen that, as the buffer 174 begins to approach its maximum capacity, the threshold is adjusted to effectively shorten the length of subsequent derivative addresses input to the buffer 174. Thus, over time the buffer will have an average capacity of preferably 50%. More importantly, however, automatic adjustment of the threshold guarantees that the buffer will not empty or overflow.

As just described, the derivative addresses will have variable address lengths depending on the threshold value. Consequently, a plurality of the derivative addresses (whether Huffman encoded or not) and/or associated mean values represent variable-rate vector quantized data.

Figure 8A:
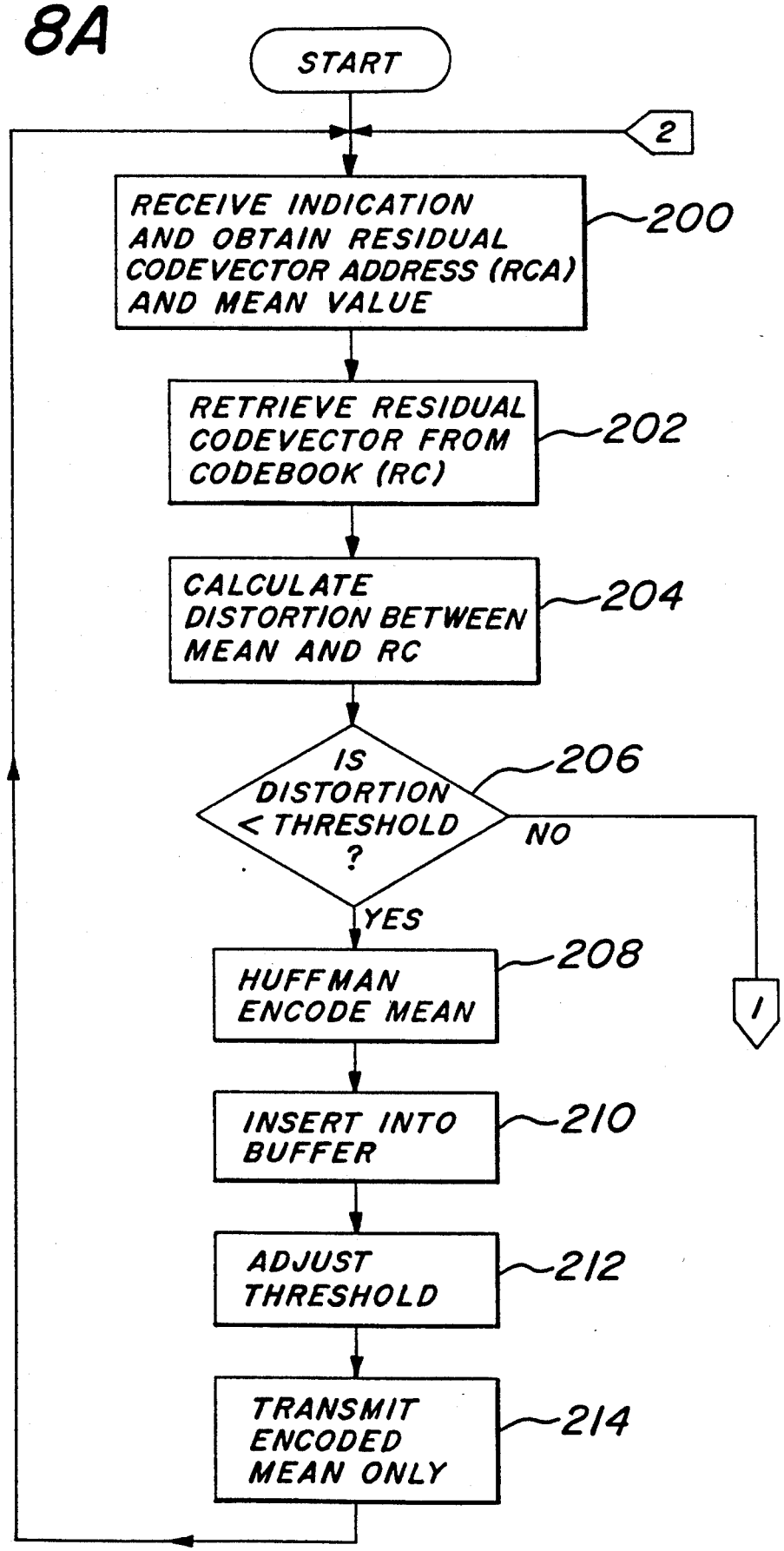
FIGS. 8A-8B are a flowchart illustrating both the operation of the apparatus of FIG. 7 and one embodiment for carrying out the fixed-rate to variable-rate data transformation method of the present invention.
Figure 8B:
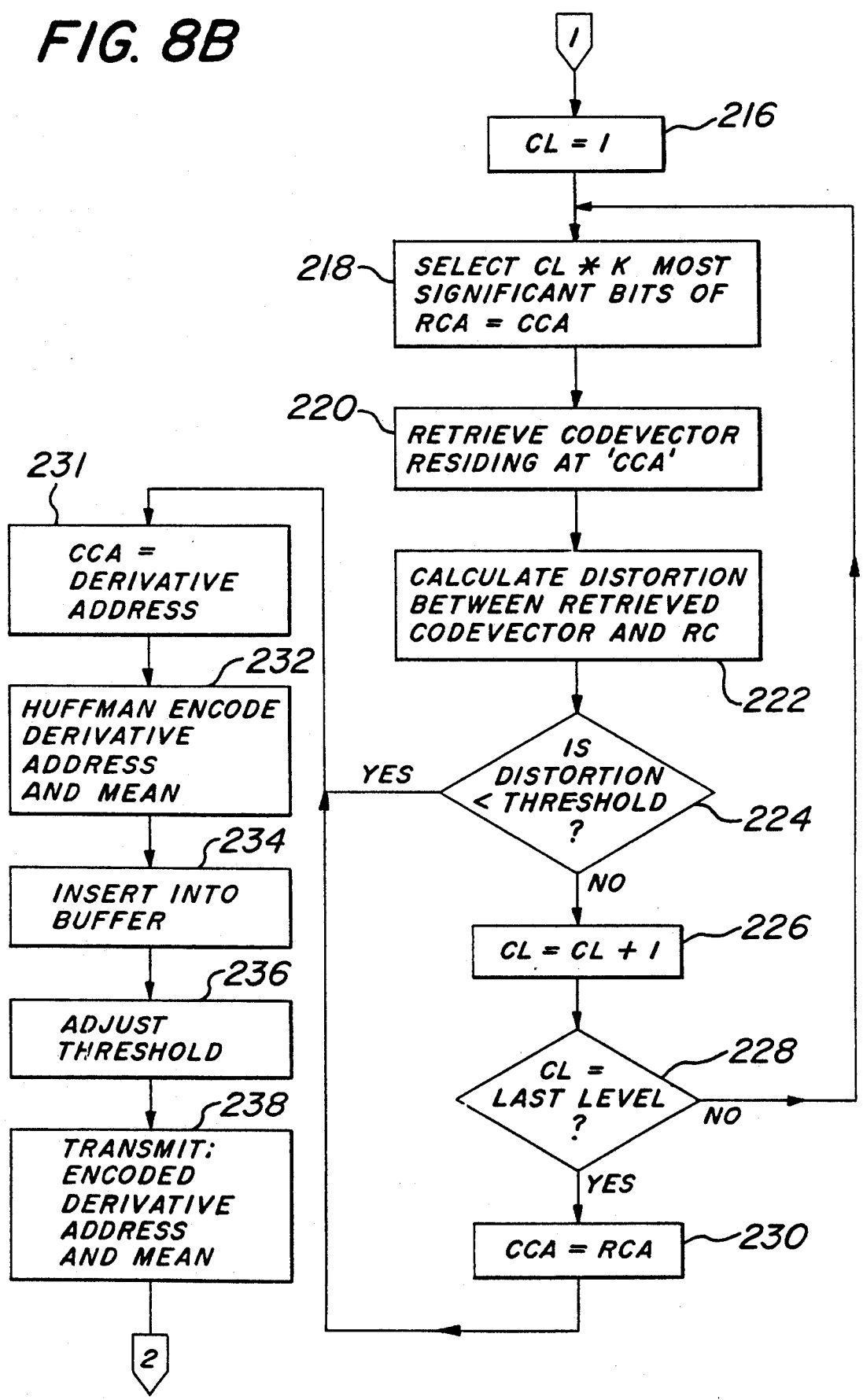

FIGS. 8a and 8b comprise a flowchart illustrating the operation of the fixed-rate to variable-rate transformer apparatus 130 of FIG. 7, and one embodiment of the method of the present invention. As shown in FIG. 8a, at step 200, an indication is received from the encoder 100 and a residual codevector address (RCA) and mean value are obtained therefrom. As previously mentioned, the RCA has a length of N * K bits and is the address of an Nth level residual codevector RC. In step 202, the RC residing at the obtained RCA is retrieved from the codebook 140. As mentioned, because the codebook 140 of the apparatus 130 is identical to the codebook 114 of the encoder 100, the retrieved RC is identical to the RC selected at the encoder 100 as most closely resembling the RV for the corresponding input vector. Next, at step 204, a measure of distortion between the received mean value and the retrieved RC is calculated. At step 206, the measure of distortion is compared to the threshold, and if the measure of distortion is less than the threshold, control passes to step 208. As mentioned previously, in such cases, only the mean value will be transmitted to the receiving locations, and thus at step 208 the mean value is Huffmann encoded. The Huffmann encoded mean is then inserted into the buffer 174, as shown at step 210. At step 212, the threshold is adjusted and control passes to step 214 where the encoded mean only is transmitted. Control then passes back to step 200 where the next indication is received and another RCA and mean value are obtained therefrom.

If in step 206 it is determined that the measure of distortion between the mean value and the retrieved RC is greater than the threshold, then the controller 154 will transform the obtained RCA to a derivative address having a length ranging from k to N * k bits. In such a case, control passes from step 206 (FIG. 8a) to step 216 (FIG. 8b).

Referring now to FIG. 8b, at step 216, an initial level of the codebook is selected. In the present embodiment the initial level of the codebook is the first level. The controller 154 defines a value CL that identifies this currently selected level. Next, at step 218, the controller 154 selects the CL * k (CL multiplied by k) most significant bits of the obtained RCA. A current codevector address (CCA) is defined as this selected portion of the obtained RCA. Recall from the discussion of the properties of a tree structured codebook that the CL * k most significant bits of the address of a codevector in the last level of a tree structured codebook form the address of a parent codevector (in the CLth level) of that bottom level codevector. Thus, the CCA (i.e., the CL * k most significant bits of the obtained RCA) is the address of a codevector in the currently selected level that is a parent to the retrieved RC.

Next, at step 220 the codevector residing at the CCA is retrieved from the currently selected level of the codebook 114. As mentioned, the codevector retrieved from the currently selected level is a parent codevector to the retrieved RC. Recall further that parent codevectors in preceding levels of a codebook generally represent a given input vector (or residual vector RV in this case) with less accuracy than the codevector in the last level of the codebook. Thus, the parent codevector retrieved from the currently selected level of the codebook 140 will generally represent the RV of the given input vector under consideration with less accuracy than the retrieved RC.

At step 222, a measure of distortion is calculated between the parent codevector retrieved from the currently selected level (i.e., the codevector residing at the CCA) and the retrieved RC. The measure of distortion is compared to the threshold at step 224. It is understood by those skilled in the art that comparison of a bottom level residual codevector, such as the RC, to a preceding level parent codevector is only valid if the residual codevectors stored in the codebooks 114, 140 are all zero-mean codevectors (i.e., if the mean value of each of the stored residual codevectors is zero). If such is not the case, then prior to obtaining a measure of difference, the mean value of the current IV would have to be added to both the RC and the parent codevector. In the present embodiment, the residual codevectors stored in the codebooks 114, 140 are zero-mean residual codevectors, and the addition of the mean value is not necessary prior to obtaining a measure of difference. It is understood, however, that the present invention is not limited to codebooks having zero-mean residual codevectors.

If, at step 224 it is determined that the measure of distortion is less than the threshold, control passes to step 231 where the CCA becomes a finally selected portion of the residual codevector address and that finally selected portion defines the derivative address. Thus, in this situation, the derivative address is the address of a parent codevector of the retrieved RC. Because the parent codevector is from a preceding level of the codebook, it represents the RV for the current input vector with less accuracy than the retrieved RC. However, the threshold comparison at step 224 insures that the difference between the parent codevector and the retrieved RC is within an acceptable limit (the threshold also controls the length of the derivative address).

The derivative address is then Huffmann encoded at step 232 and inserted into the buffer 174 at step 234. At step 236, the threshold is adjusted according to the measure of buffer fullness, and at step 238 the Huffmann encoded derivative address is transmitted along with the Huffmann encoded mean. Control then passes back to step 200 where the next indication is received from the encoder 100.

If at step 224, it is determined that the measure of distortion is greater than the threshold, then control passes to step 226 where a next level of the codebook is selected that succeeds the currently selected level and the value CL is redefined to indicate that the next level is now the currently selected level. At step 228, it is determined whether the next level (which is now the currently selected level) is the last level of the codebook 114. If not, control passes back to step 218 where, again, CL * K bits (the most significant bits) of the obtained RCA are selected. This time, however, the CL * k bits represent a larger portion of the obtained RCA because the value CL, which now identifies a lower level of the codebook 114, is greater. The CCA is then redefined as the newly selected portion and control passes to step 220. Again, at step 220 the codevector residing at the CCA is selected from the currently selected level of the codebook 114. A measure of distortion is calculated in step 222 (as before) and the measure of distortion is compared to the threshold in step 224. Once again, if the distortion is greater than the threshold, then control passes to step 226 where a next level of the codebook is selected that succeeds the currently selected level, and at step 228, it is determined whether this next level is the last level of the codebook.

If the next level is not the last level, then steps 218 through 228 are repeated again. This process will continue until either a next level selected is the last level or the threshold is satisfied in step 224.

If a situation occurs where a next level selected is the last level of the codebook, control passes to step 230 where the CCA is automatically redefined as the entire obtained RCA. This is done because, if control were to pass back to step 218 with the value CL identifying the last level of the codebook, then the controller 154 would be selecting the entire obtained RCA anyway. Thus, at step 230, the CCA is simply set equal to the obtained RCA to save the controller 154 from performing steps 218 through 228 needlessly. At step 231, then, the obtained RCA (which is the CCA) becomes the derivative address and in effect, no transformation has been performed; that is, the derivative address is the address of the obtained RCA which, of course, is the address of the residual codevector selected at the encoder 100 for the given input vector.

As before, the derivative address is Huffmann encoded along with the mean value at step 232 and inserted into the buffer 174 at step 234. The threshold value is adjusted at step 236. Then, at step 238, the Huffmann encoded derivative address and mean value are transmitted. Control then passes back to step 200 (FIG. 8a) where the next indication is received from the encoder 100. This process continues so long as the apparatus 130 receives indications from the encoder 100.

As mentioned, adjustment of the threshold value effects the length of the derivative addresses produced by the controller 154. Because the threshold will vary during operation, the derivative addresses will have varying lengths. As those skilled in the art will appreciate, a plurality of the transmitted derivative addresses and/or mean values represent variable-rate vector quantized data. Thus, the fixed-rate vector quantized data received from the encoder 100 has been transformed to variable-rate vector quantized data by the apparatus 130. The variable-rate VQ data generally is more highly compressed than the fixed-rate data received from the encoder 100.

As shown in FIGS. 8A and 8B, in the present embodiment, the threshold is adjusted between the receipt of each indication transmitted by the encoder 100. However, a plurality of indications will be created at the encoder 100 for each single image frame. If desired, the threshold value may be adjusted only between image frames. Thus, it may be desired to adjust the threshold only between the time that a last indication transmitted for one image frame and a first indication transmitted for a subsequent image frame are received.

FIG. 9 illustrates, in flowchart form, how the threshold value is adjusted according to the present embodiment of the invention. As Huffman codes (for the mean values and derivative addresses) are inserted into the buffer 174 (step 240), and also as serial data is transmitted out of the buffer at a fixed data rate (step 242), the threshold is recalculated as a function of buffer fullness (step 244). As previously mentioned, however, the threshold value provided to the controller 154 and the calculator 146 is adjusted only in-between receipt of indications in step 200 of FIG. 8a. Alternatively, the value of the threshold can be adjusted only once for each complete image frame processed.

The data bits representing the variable-rate VQ data (i.e., the derivative address and mean value data) are serially transmitted from the buffer 174 at a constant bit rate.

FIG. 10 graphically illustrates the concept of employing buffer fullness to adjust the threshold value. As shown, remaining buffer capacity varies as a function of the length of the variable-rate input data (i.e., the Huffman encoded derivative addresses and/or mean values) since data is transmitted from the buffer 174 at a uniform bit rate. As shown by the line inside the buffer 174 of FIG. 10, the threshold value increases toward a maximum as unused capacity decreases, and the threshold value decreases toward a minimum as unused buffer capacity increases. Theoretical considerations for establishing minimum and maximum threshold values are:

Min threshold = 0;
Max threshold = absolute value of [maxpix − minpix] * numpix;
or,
Max threshold = [maxpix − minpix]2 * numpix;
where:
maxpix = maximum grey level of pixels;
minpix = minimum grey level of pixels;
numpix = block (sub-image) size However, in practice, max threshold can be set to a value smaller than the theoretical maximum since the theoretical value is not likely to ever occur. This ensures better buffer utilization without requiring an excessively large buffer.

Figure 11:
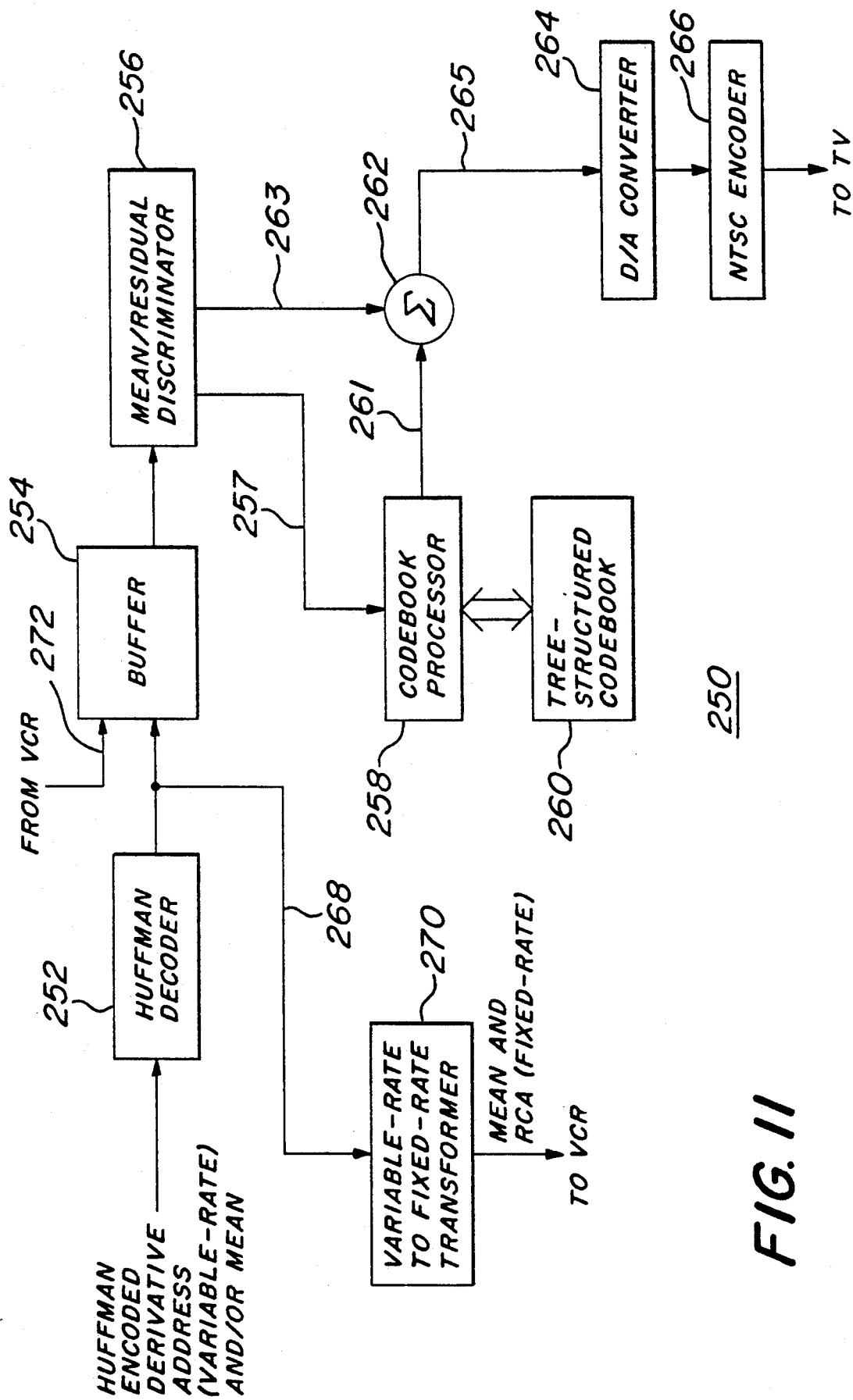
FIG. 11 is a block diagram of a decoder apparatus for use in connection with one embodiment of the method and apparatus of the present invention.

Referring now to FIG. 11, there is shown a block diagram of an apparatus (decoder) that may be used in connection with the present embodiment of the method and apparatus of the present invention. Specifically, the decoder 250 of FIG. 11 is for receiving variable-rate vector quantized data transmitted from the buffer 174 and converting the same back to image data. Alternatively, the apparatus 250 may be employed to transform the variable-rate vector quantized data back to fixed-rate when it is desired to store the vector quantized data on magnetic media in the vicinity of the decoder. The apparatus of FIG. 9 may be employed to implement collectively, blocks 34, 38, and 40 of FIG. 1.

As shown, a Huffmann decoder 252 receives and decodes the Huffmann encoded data transmitted from the buffer 174 to obtain the derivative address and mean value therefrom. These are stored, preferably on a per-frame basis, in a buffer 254. In one preferred implementation, these data are stored for both the complete current frame and the complete immediately preceding frame so that interpolated mean values can be computed. A discriminator circuit 256 retrieves the obtained derivative address from the buffer 254 and provides it on a line 257 to a codebook processor 258 that may be identical to the codebook processor 138 of FIG. 7. The apparatus 250 of FIG. 11 is also provided with a tree structured codebook 260 which is identical to the tree structured codebook 114 of the VQ encoder apparatus 100 of FIG. 6 and to the tree structured codebook 140 of the fixed-rate to variable-rate transformer apparatus 130 of FIG. 7. The address on line 257 provided by the discriminator circuit 256 is employed by the codebook processor 258 to retrieve from the codebook 260 the codevector residing at the obtained derivative address. The retrieved codevector will either be an identical representation of the RC selected at the encoder 100 (i.e., the derivative address=RCA) or a substantial representation of the RC selected at the encoder 100 (i.e., the derivative address=the address of a parent codevector of the RC). This retrieved codevector is supplied on a line 261 to the input of a summing circuit 262. The discriminator 256 supplies the mean value to another input of the summer 262 via a line 263. The summer adds the mean value to the retrieved codevector to supply, on a line 265, a reproduced codevector which is a substantial representation, in the form of a digital value, of the given input vector processed by the encoder 100. Each digital value is then converted to analog form by the digital to analog converter 264 and NTSC encoded by the encoder 266. The NTSC encoded data is then supplied to the input of a TV as hereinbefore described.

Alternatively, the decoded derivative address and/or mean value data may be provided on a line 268 to a variable-rate to fixed-rate transformer 268 (recall that a plurality of derivative addresses and/or mean values represent variable-rate VQ data). The transformer 268 will transform the variable-rate VQ data to fixed-rate when it is desired to store the VQ data on magnetic media in the vicinity of the decoder. As mentioned in the background section, magnetic media are notoriously noisy and storage of the VQ data in fixed-rate form is therefore desirable. Variable-rate to fixed-rate transformation is known in the art. Basically, variable-rate to fixed-rate transformation is achieved by transforming each of the variable-length derivative addresses in the variable-rate data stream to a same pre-determined length by padding each address, for example, with zeros. The uniform length addresses resulting from the transformation represent fixed-rate vector quantized data which may then be stored on the magnetic media.

The uniform length addresses, however, will still address the same respective codevectors in the codebook 260 as would have been addressed had the addresses been left in variable-rate form. Thus, if it is desired to "play-back" the magnetically recorded data, the recording device (e.g., a VCR), may simply supply the fixed-rate data to the buffer 254 via a line 272.

Although the apparatus (decoder) 250 has been described herein for use in connection with the fixed-rate to variable-rate transformer apparatus and method of the present invention, the apparatus 250 may be used in any vector quantization data compression system that transmits variable-rate VQ data to the locale of the decoder 250.

Figure 12:
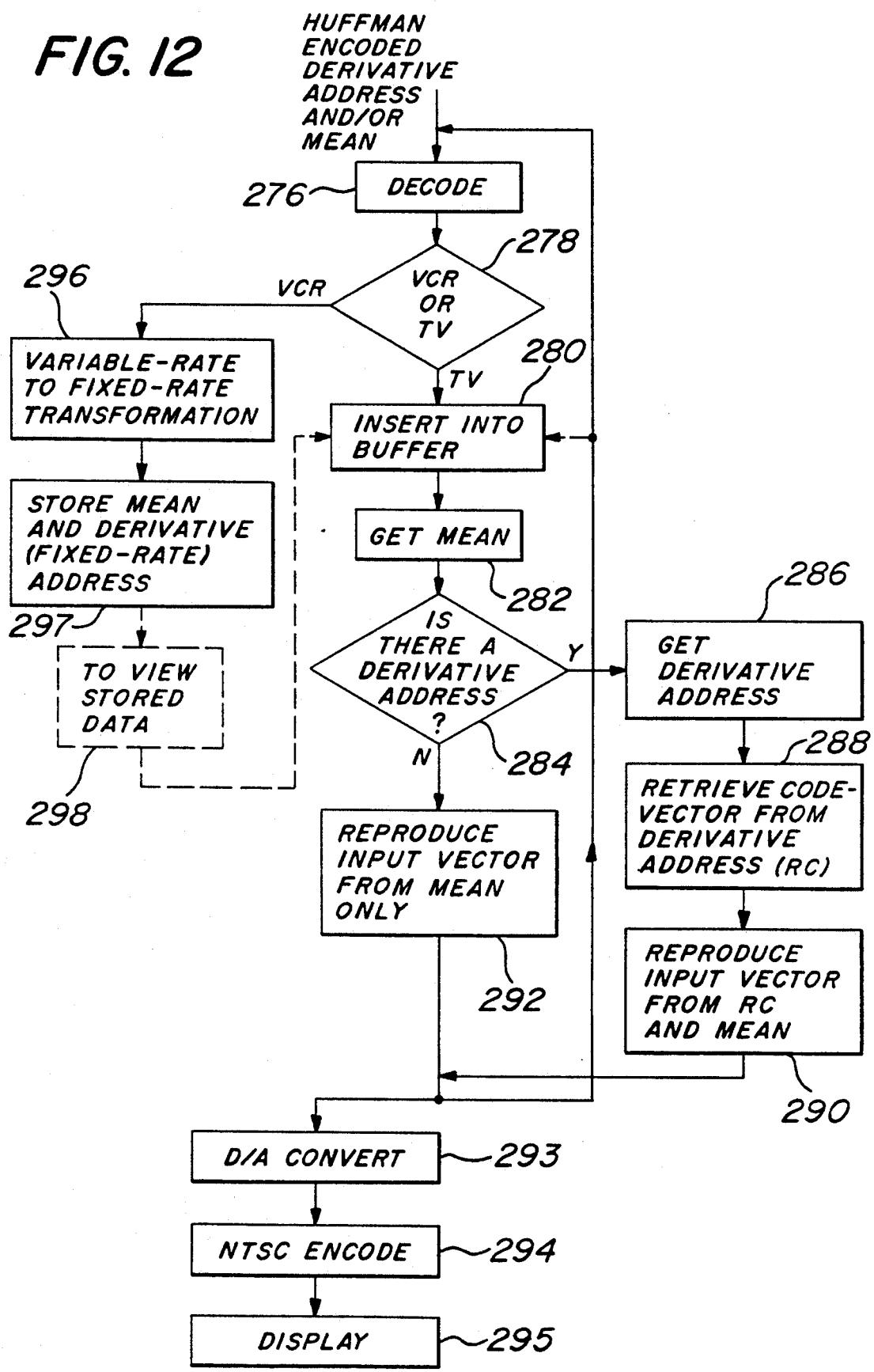
FIG. 12 is a flowchart illustrating the operation of the apparatus of FIG. 11.

FIG. 12 is a flowchart illustrating the operation of the decoder 250 of FIG. 11. As shown, each received Huffmann encoded derivative address and/or mean value is decoded by circuit 252, as shown at step 276. Control then passes to step 278 where it is determined whether the incoming VQ data will be displayed on a television at the locale of the decoder or recorded on magnetic media by, for example, a VCR at the locale of the decoder. If the VQ data is to be displayed on a television, control passes to step 280 where the derivative address and/or mean value is inserted into the buffer 254. Then, at step 282 the mean value is retrieved from the buffer and, at step 284, it is determined whether there is a derivative address accompanying the mean value. As previously mentioned, this may be determined by examining the mean value for an appended code (recall that such a code would be appended to the mean value by the fixed-rate-to-variable-rate transformer 130 to indicate that the mean only was transmitted). If, at step 284, it is determined that a derivative address did not accompany the mean value, then, as shown at step 292, the input vector is reproduced solely from the mean value.

If, at step 284, it is determined that a derivative address did accompany the transmission of the mean value, that derivative address is retrieved from the buffer at step 286. Then, at step 288, the codevector residing at the derivative address in the codebook 260 of the decoder 250 is retrieved. As shown at step 290, the input vector is reproduced by adding the mean value back to the retrieved codevector.

The input vector reproduced in either steps 290 or 292 is then converted to analog form (step 293) and NTSC encoded at step 294. Thereafter, the NTSC image data may be displayed on a TV, as shown at step 295.

If at step 278, it is determined that the VQ data is to be stored on magnetic media by, for example, a VCR, then control passes to step 296 where the VQ data, currently in variable-rate form, is transformed to fixed-rate VQ data. Then, in step 297, the fixed-rate VQ data is stored on the magnetic media. As shown at step 298, if it is desired to view the stored data, the fixed-rate VQ data is supplied to the buffer 254 via line 272 and control passes to step 280. Steps 280 through 295 are then repeated for the stored data.

Figure 13:
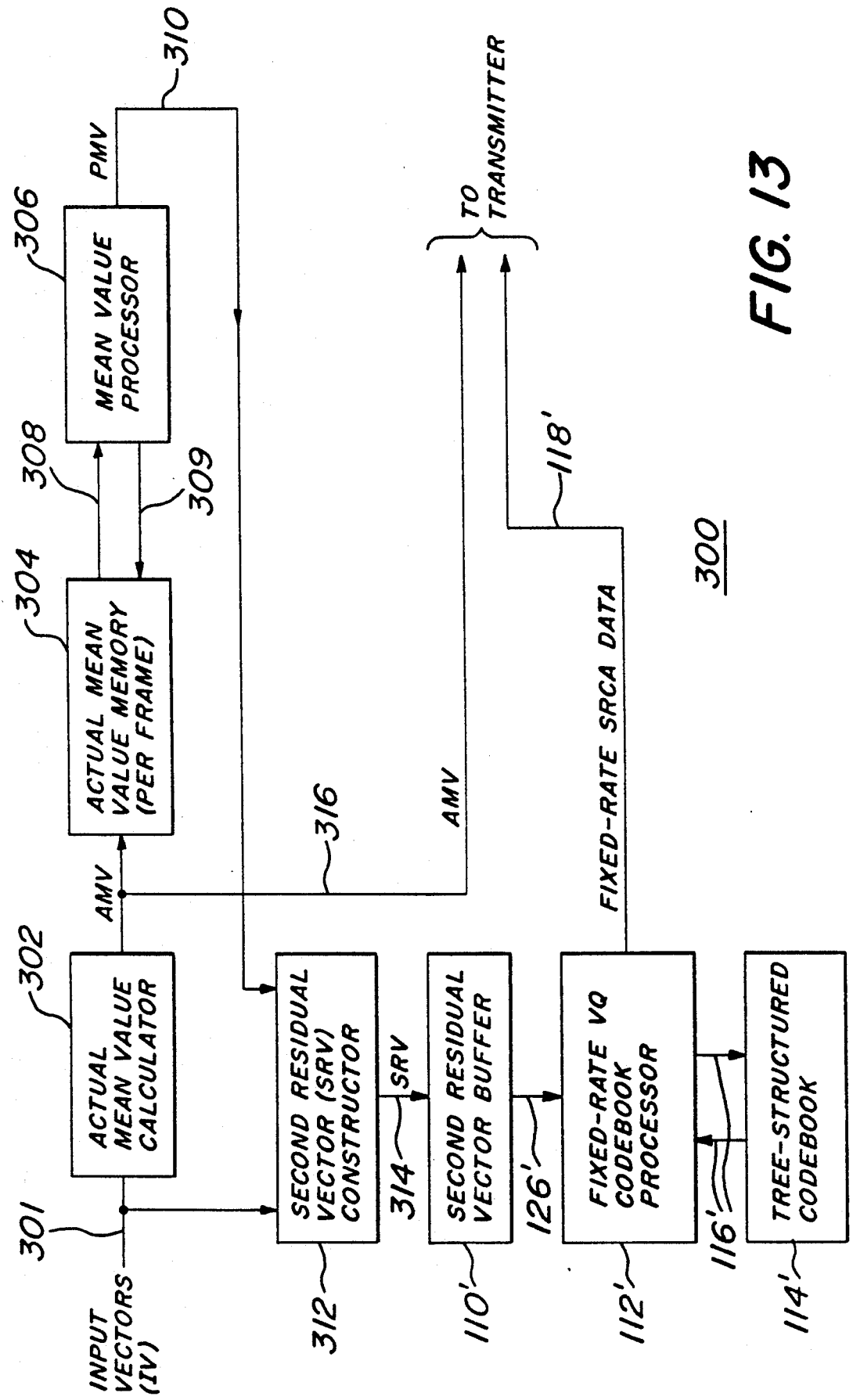
FIG. 13 is a block diagram illustrating an encoder apparatus for use in connection with a most preferred embodiment of the method and apparatus of the present invention.
Figure 14:
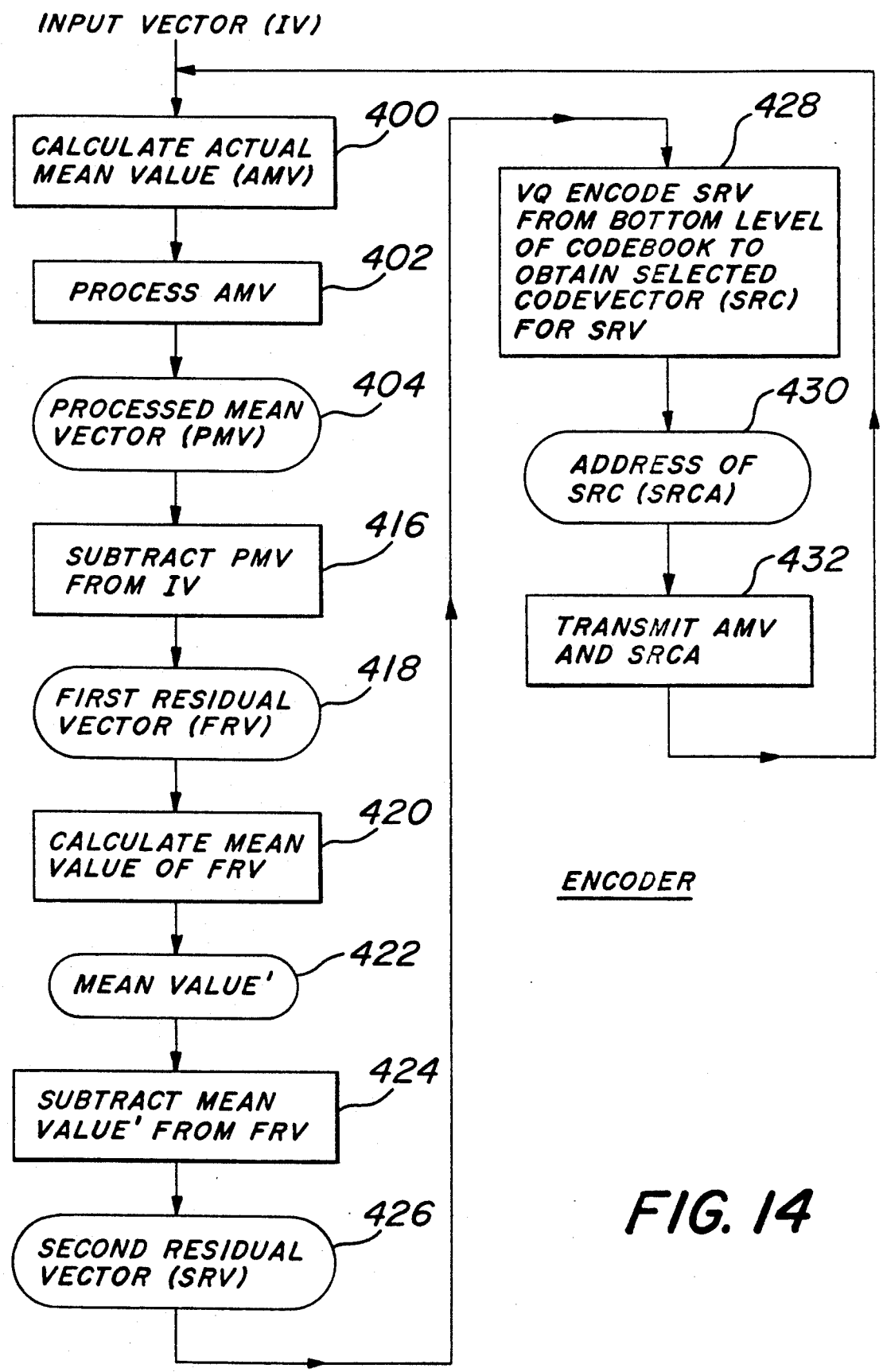
FIG. 14 is a flowchart illustrating the operation of the apparatus of FIG. 13.
Figure 15:
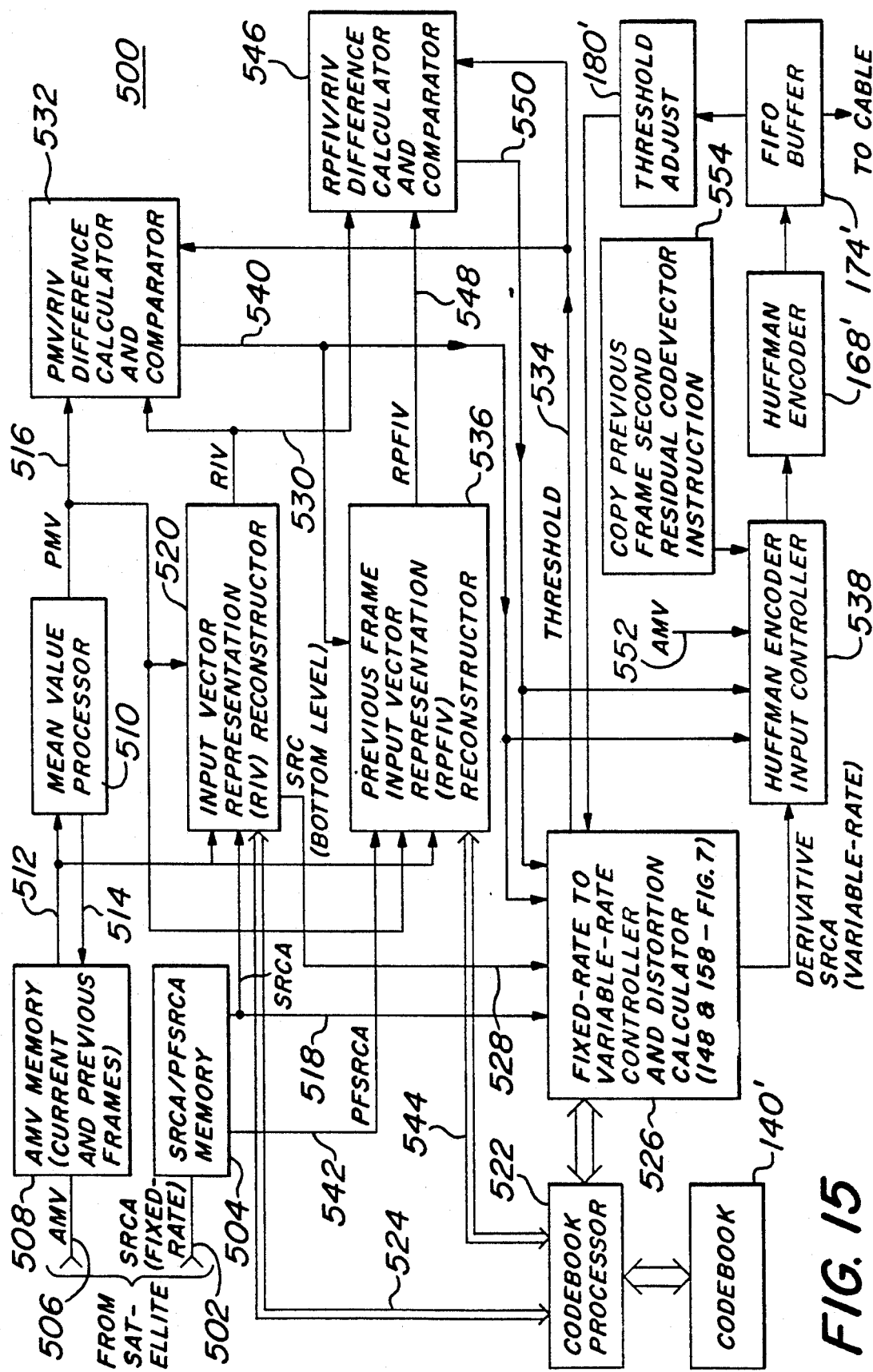
FIG. 15 is a block diagram of a fixed-rate VQ data to variable-rate VQ data transformer in accordance with a most preferred embodiment of the present invention.
Figure 16A:
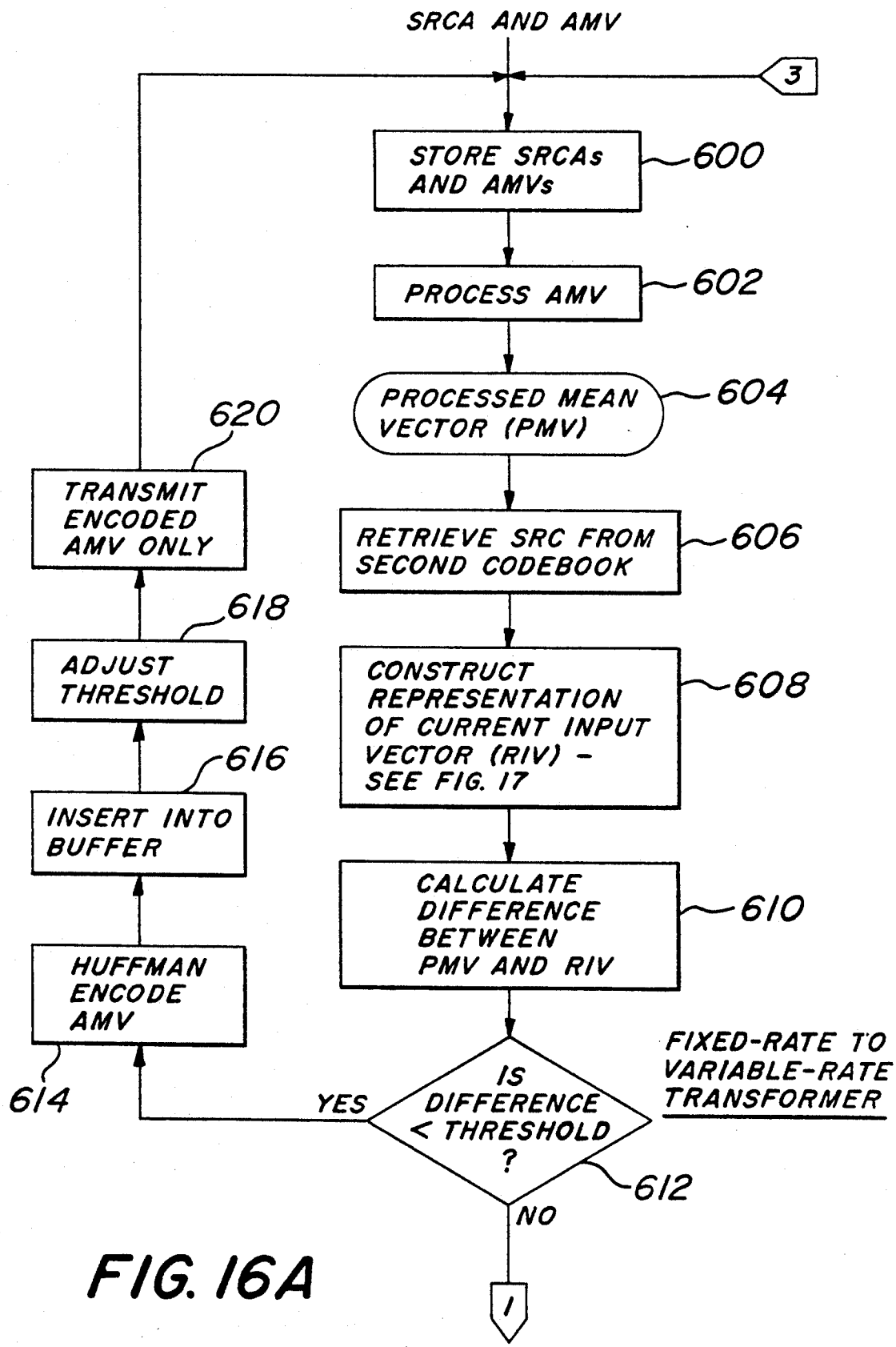
FIGS. 16A–16C are a flowchart =illustrating both the operation of the apparatus of FIG. 15 and a most preferred embodiment for carrying out the fixed-rate to variable-rate data transformation method of the present invention.
Figure 16B:
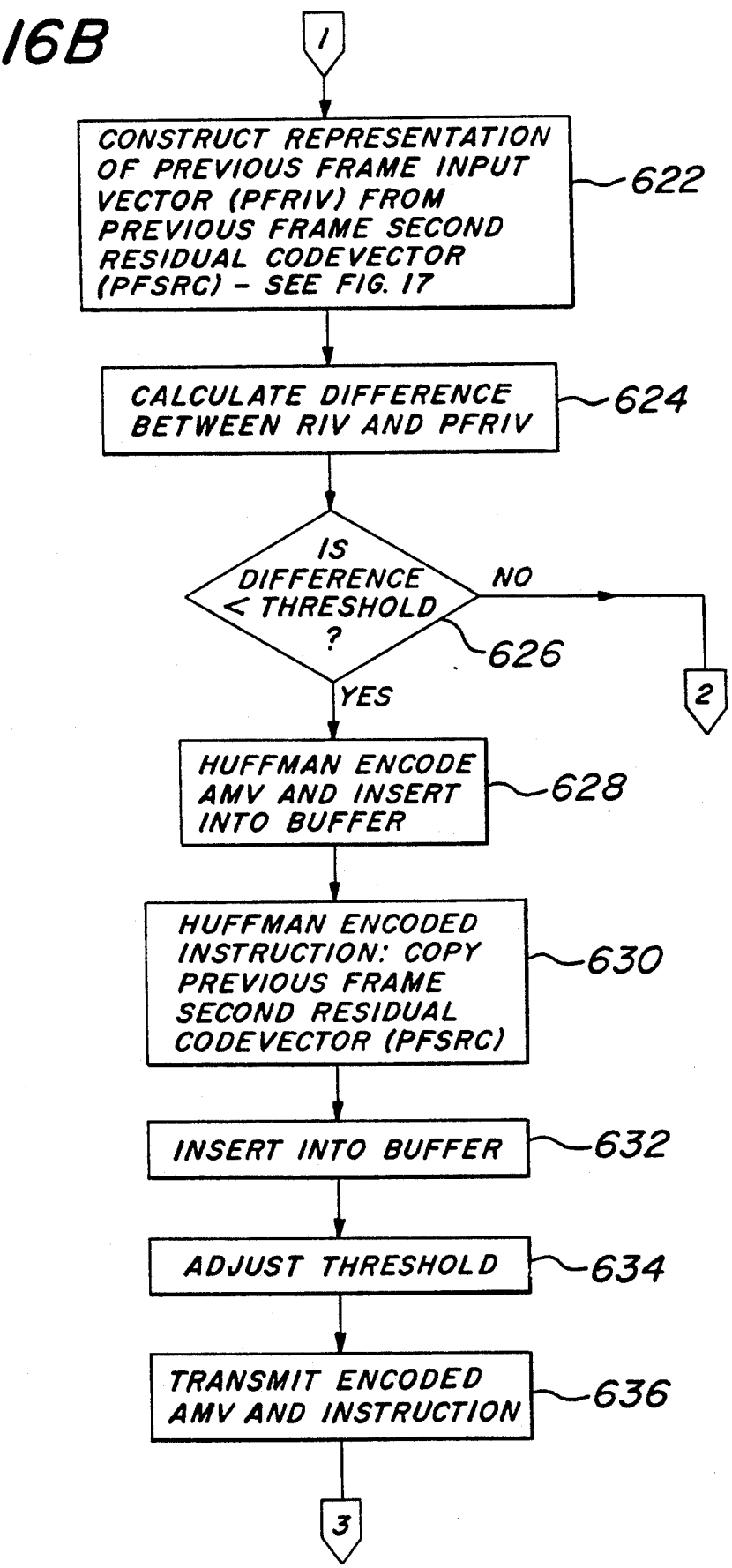
Figure 16C:
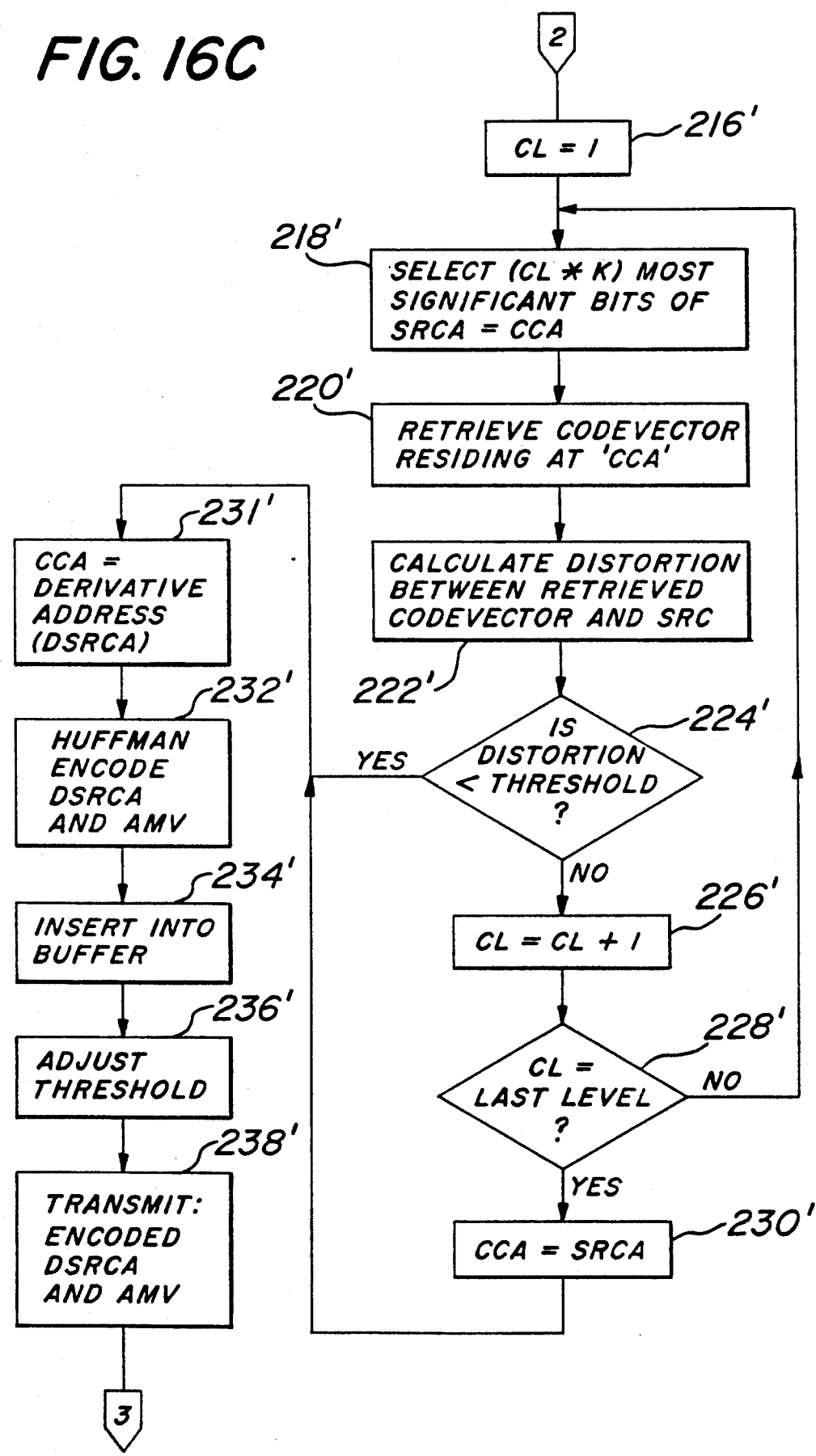
Figure 17:
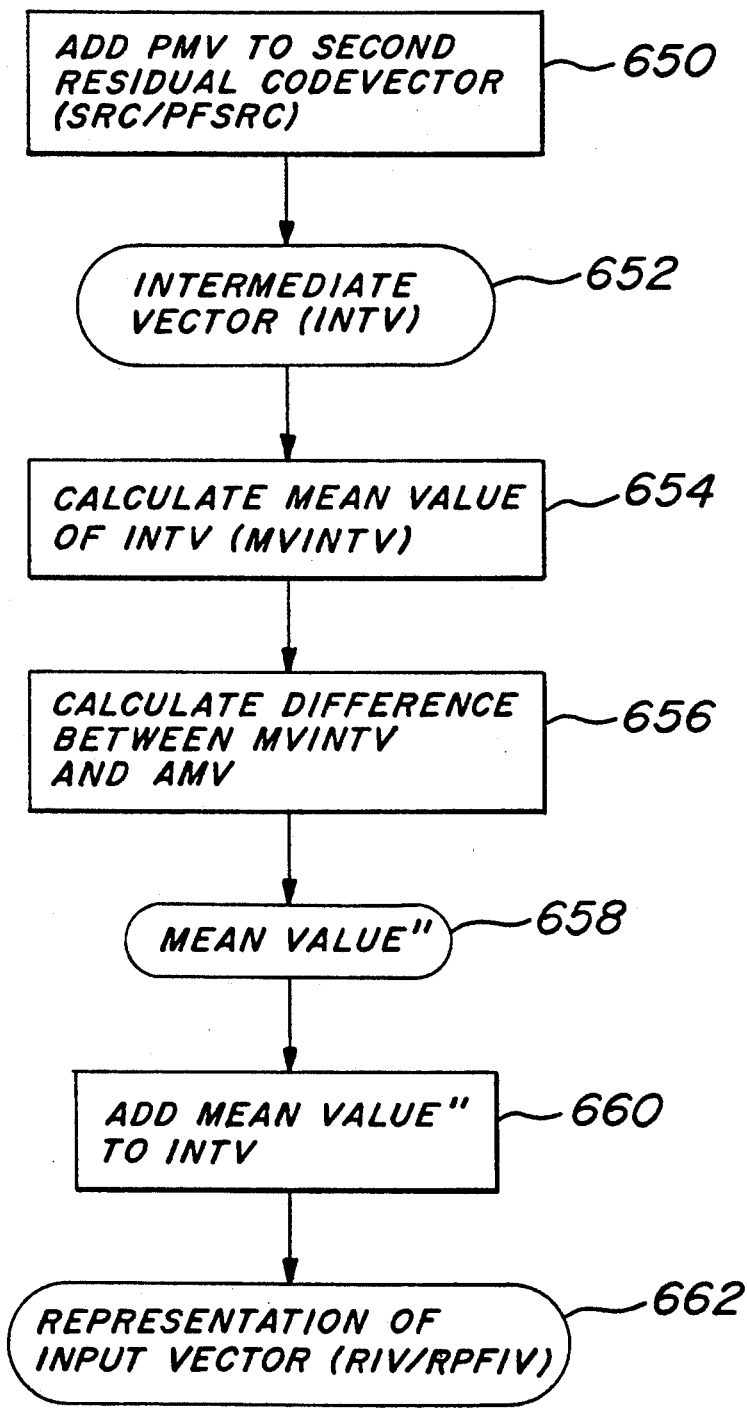
FIG. 17 is a flowchart illustrating details of blocks 608 and 622 of FIGS. 16A–16B.
Figure 18:
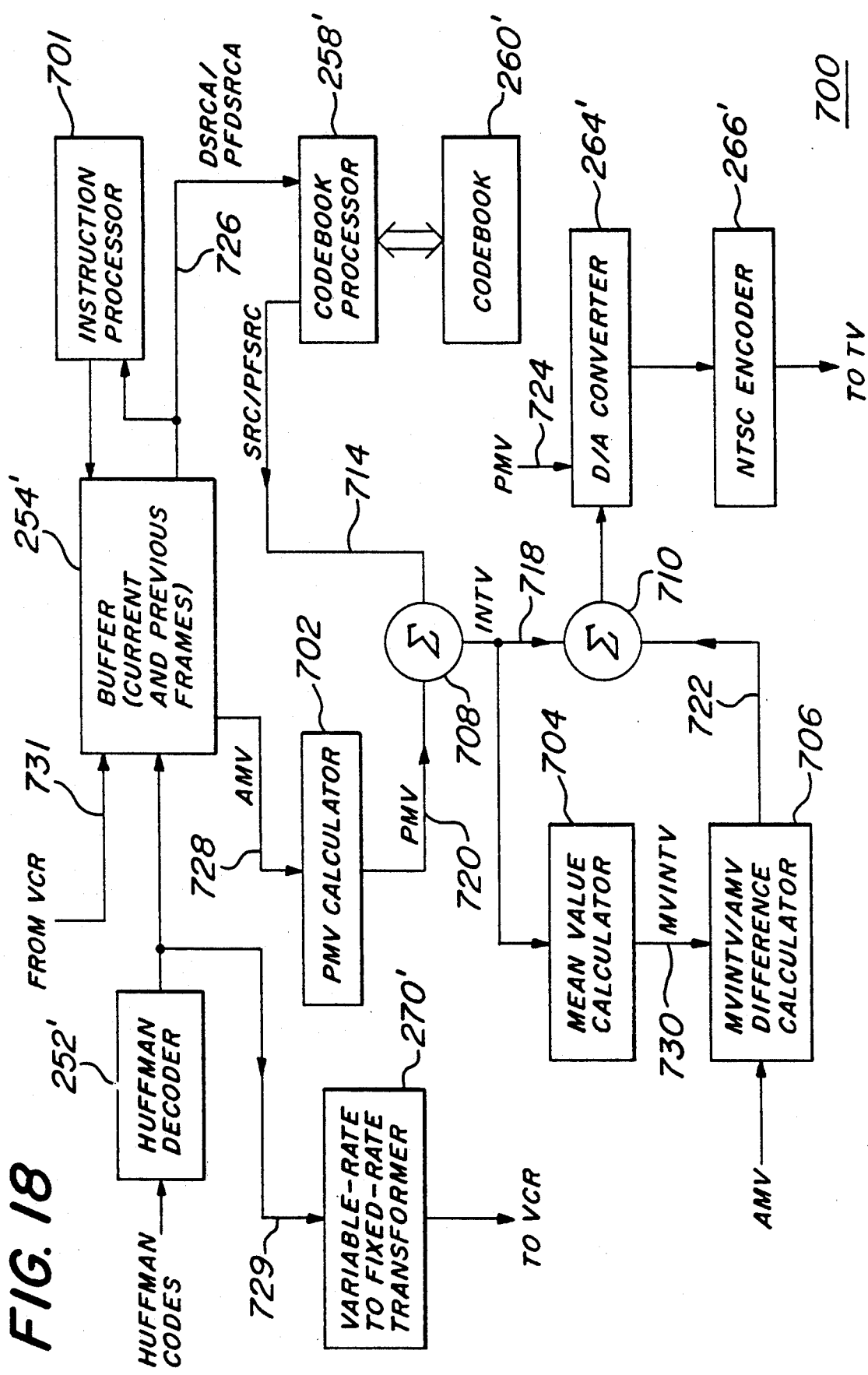
FIG. 18 is a block diagram of a decoder apparatus for use in connection with a most preferred embodiment of the method and apparatus of the present invention.
Figure 19B:
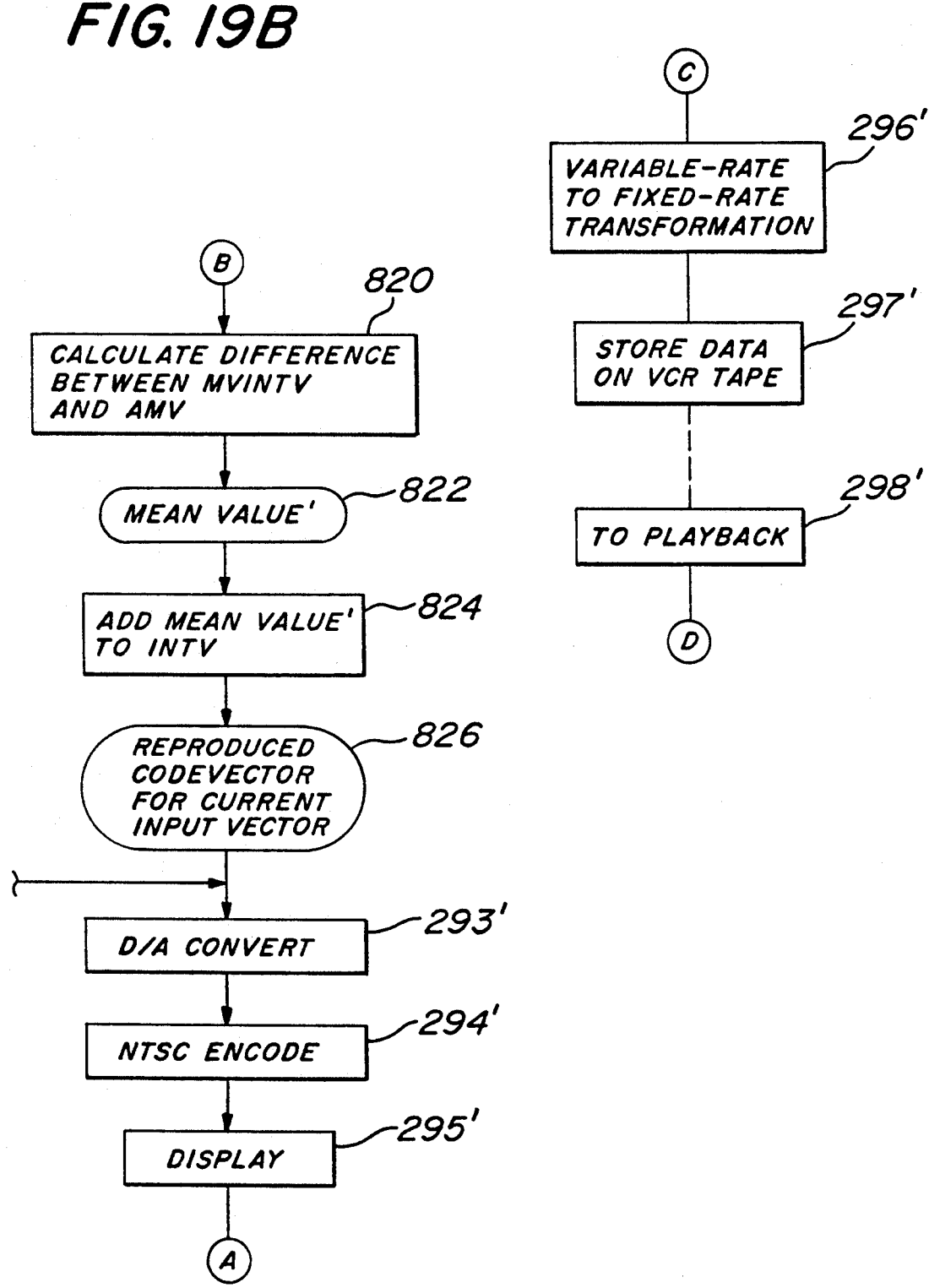

FIGS. 13-19B illustrate a most preferred embodiment of the method and apparatus of the present invention. In particular, FIG. 13 illustrates a block diagram of an encoder that may be used in connection with the most preferred embodiment of the present invention, and FIG. 14 illustrates the operation thereof. FIG. 15 is a block diagram illustrating a most preferred embodiment of the fixed-rate-to-variable-rate transformer apparatus of the present invention. FIGS. 16A-16C are a flowchart illustrating the operation of the apparatus of FIG. 15 and a most preferred embodiment of the method of the present invention. FIG. 18 is a block diagram illustrating a decoder that may be used in connection with the most preferred embodiment of the method and apparatus of the present invention, and FIGS. 19A-19B are a flowchart illustrating the operation thereof. The encoder of FIG. 13 may be employed to implement block 22 FIG. 1, the apparatus of FIG. 15 may be employed to implement block 28 of FIG. 1, and the decoder of FIG. 18 may be employed to implement collectively, blocks 34, 38 and 40 of FIG. 1.

Referring now to FIG. 13, an encoder labeled generally 300, is shown that may be used in connection with the fixed-rate to variable-rate transformation method and apparatus of the present invention. An important difference between the encoder 300 of FIG. 13 and the encoder 100 of FIG. 6 is that "second residual codevectors" are stored in the codebook 114' of the encoder 300 of FIG. 13, whereas the codebook 114 of the encoder 100 of FIG. 6 stores "first residual codevectors". A first residual codevector is one that corresponds to an input vector with a mean value once removed. A second residual codevector is one that corresponds to an input vector with mean values twice removed. The manner in which second residual codevectors are generated is discussed below.

Another principal difference between the operation of the encoder 300 of FIG. 13 and the encoder 100 of FIG. 6 is that, in the encoder 300 of FIG. 13, mean values for an entire frame of input vectors are computed and stored in the encoder before vector quantization is performed on each of those input vectors. The reason for preprocessing the input vectors and storing their mean values is explained below.

The encoder 300 comprises an actual mean value calculator 302 which computes the actual mean value (AMV) of the input vectors (IV) of each frame. The AMV's are scalar quantities. All of the AMV's for each frame are stored in a memory 304. Thus, AMV's for each frame are computed and stored in the memory 304 before any further processing takes place.

A mean value processor 306 selects, via lines 308, 309, the AMV for a current IV under consideration, and computes therefor a processed mean vector, PMV, which is supplied on an output 310 of the processor 306. The PMV for each input vector IV is a vector quantity that is interpolated from the AMV's for both the current IV, as well as from all IV's that surround the current IV. The function of the processor 306 is to provide a PMV for the current IV which, when combined with the PMV for surrounding IV's, reduces or eliminates "blocking" at or near the edges of adjoining vectors. Essentially, this is achieved by interpolating, from the AMV's for the current and surrounding IV's, values for the individual PMV vector elements that will not result in drastic magnitude changes at vector boundaries. Values for the individual PMV vector elements near the center of each vector are similarly interpolated from these AMV's and are chosen so that the average value of the vector elements in each PMV is the same or similar to the AMV for the current IV. Such interpolation techniques are well known in the art. One such interpolation technique is summarized in Shen, Hsiaouhui and Baker, Richard L., "A Finite State/Frame Difference Interpolative Vector Quantizer For Low Rate Image Sequence Coding", *IEEE Int. Conf. Acoust., Speech, Signal Processing*, vol. 2, pp. 1188-1191, April 1988. See also Hang, H. and Haskell, B., "Interpolative Vector Quantization of Color Images". Both of these references are incorporated herein by reference. Copending patent application Ser. No. 794,487, entitled "Method Apparatus for Low Frequency Removal in Vector Quantization" also describes a technique that may be employed to reduce blocking artifacts.

The PMV from the processor 306 and the current IV are both supplied to a second residual vector (SRV) constructor 324 via lines 310, 301, respectively. The nature and purpose of the SRV will become evident hereinafter. The SRV is supplied via line 314 to a second residual vector buffer 110'. The SRV may be provided to a fixed-rate VQ codebook processor 112' which bi-directionally communicates with a tree-structured codebook 114' via lines 116'. The operation of blocks 110',112' and 114' is the same as the operation of blocks 110, 112 and 114 of FIG. 6 described above; that is, the fixed-rate VQ processor 112' selects from the Nth level of the codebook 114'. However, as mentioned above, the codebook 114' stores second residual codevectors (SRC's) instead of first residual codevectors, and therefore the codebook processor 112' selects the second residual codevector (SRC) from the Nth level that most closely resembles the SRV. The output of the codebook processor 112 is a second residual codevector address (SRCA) which is supplied, on a line 118', to a transmitter (not shown). The AMV for the current input vector is also supplied, on a line 316, to the transmitter (not shown).

The transmitter may be the same transmitter described in conjunction with FIG. 6. The transmitter (not shown) transmits an indication of the SRCA and of the AMV of the current input vector to an intermediate location (not shown) via a first medium. As mentioned above, in the preferred embodiment, the intermediate location is a cable head-end and the first medium is a satellite communications link.

The encoder 300 will transmit an indication of an SRCA and AMV for each input vector in the image frame. A plurality of the transmitted indications represents fixed-rate vector quantized data.

Referring now to the flowchart of FIG. 14, the operation of the encoder 300 of FIG. 13 will be described. As shown at step 400, the AMV's for all IV's for the current frame are calculated and stored in the memory 304. As shown at step 402, the AMV for a current IV is processed, as described above, to yield the PMV for the current IV as shown at 404. At step 416, the PMV is subtracted from the current IV to yield a first residual vector (FRV), as shown at 418. Then, the mean value (a scalar quantity, not a vector quantity) of the FRV is calculated, as shown at step 420. The result defines a mean value', as shown at step 422. At step 422, the mean value' is subtracted from FRV to yield a second residual vector (SRV). As shown at step 428, the SRV is vector quantized by selecting from the Nth level of the codebook 114' a second residual codevector (SRC) that most closely resembles the SRV. As a result of the selection, the address (SRCA) of the selected second residual codebook is provided, as shown at step 430. As shown at step 432, an indication of the AMV and the SRCA for the current IV are transmitted to the intermediate location.

Thus, in the encoder 300 of FIG. 13, vector quantization is carried out upon a second residual vector (SRV) that is twice removed from its corresponding input vector IV. It has been found that vector quantization of the SRV, rather than vector quantization of the first residual vector FRV (which is the residual vector employed in the encoder 100 of FIG. 7) provides better compression and yields better reproduction results at the decoder.

Referring now to FIG. 15, there is illustrated a most preferred embodiment of an apparatus 500 for transforming fixed-rate vector quantized data to variable-rate vector quantized data in accordance with the present invention. The apparatus 500 may be employed to implement block 28 of FIG. 1. As illustrated in FIG. 15, and as described herein, the apparatus 500 may be used in connection with the VQ encoder apparatus 300 of FIG. 13. A principal difference between the operation of the transformer apparatus 500 of FIG. 15 and the transformer apparatus 130 of FIG. 7 is the manner in which redundant, or similar, second residual codevectors in current and previous frames are processed.

The apparatus 500 comprises means (not shown) for receiving indications transmitted from the transmitter location and for obtaining the SRCA and the AMV from each indication. The receiving means (not shown) may be the receiver 26 of FIG. 1. For each received indication, the obtained SRCA is supplied on a line 502 to an SRCA/PFSRCA memory 504 that stores the second residual codevector addresses for the current frame (SRCA's) as well as for the previous frame (PFSRCA's). The apparatus 500 receives all indications for a current frame and stores the obtained SRCAs for the entire current frame before any further processing take place.

Similarly, the obtained AMVs for the current frame are supplied on a line 506 to an AMV memory 508 that stores the AMVs for the entire current frame as well as for the previous frame. Recall that the AMVs are scalar quantities.

A mean value processor 510 selects, via lines 512, 514, the AMV for a current IV under consideration, and computes therefor a processed mean vector, PMV, which is supplied on an output 516 of the processor 510. As mentioned previously, the PMV for each input vector IV is a vector quantity that is interpolated from the AMV's for both the current IV, as well as from all IV's that surround the current IV. The function of the processor 510 is to provide a PMV for the current IV which, when combined with the PMV for surrounding IV's, reduces or eliminates "blocking" at or near the edges of adjoining vectors. Essentially, this is achieved by interpolating, from the AMV's for the current and surrounding IV's, values for the individual PMV vector elements that will not result in drastic magnitude changes at vector boundaries. Values for the individual PMV vector elements near the center of each vector are similarly interpolated from these AMV's and are chosen so that the average value of the vector elements in each PMV is the same or similar to the AMV for the current IV. As mentioned previously, such interpolation techniques are well known in the art.

The memory 504 supplies, via a line 518, the obtained SRCA for the current IV under consideration to an input vector representation reconstructor 520. The reconstructor 520 also receives the AMV and PMV of the current IV via lines 512 and 516 respectively. The reconstructor bi-directionally communicates with a codebook processor 522 via a pair of lines 524 in order to retrieve from a codebook 140', the second residual codevector SRC residing at the obtained SRCA. The reconstructor supplies the retrieved SRC to a fixed-rate-to-variable-rate controller/distortion calculator via a line 528 for purposes described hereinafter.

From the AMV, PMV and SRC for the current IV under consideration, the reconstructor 520 produces a representation of the current IV (RIV). The method of reconstruction will be described hereinafter. The reconstructor 520 supplies the RIV to a PMV/RIV difference calculator and comparator 532 via line 530. The PMV is also provided to the calculator/comparator 532 via line 516. For purposes described hereinafter, the calculator/comparator 532 computes the difference between the PMV and RIV and compares the difference to a threshold that is provided on line 534 from controller/calculator 526. The result of this comparison is provided to a previous frame input vector representation reconstructor 536, as well as to a Huffman encoder input controller 538 and to the controller/calculator 526, via line 540.

The previous frame input vector reconstructor 536 also receives as inputs the PMV and AMV for the current IV via lines 516 and 512 respectively, and further receives as an input, on line 542, the logically corresponding previous frame second residual codevector address (PFSRCA) from the SRCA/PFSRCA memory 504. The reconstructor 536, like the reconstructor 520, bi-directionally communicates with the codebook processor 522 via a pair of lines 544 in order to retrieve from the codebook 140', the previous frame second residual codevector PFSRC residing at the PFSRCA. From the AMV, PMV and PFSRC, the reconstructor 536 produces a representation of the previous frame input vector (RPFIV) that corresponds (spatially) to the current IV of the current frame. The reconstructor 536 reconstructs the RPFIV in a manner similar to the reconstruction of the RIV by the reconstructor 520; as mentioned, the reconstructing method is described hereinafter.

The reconstructor 536 supplies the PFRIV to a PFRIV/RIV difference calculator and comparator 546 via a line 548. The RIV is also provided to the calculator/comparator 546 via line 530. For purposes described hereinafter, the calculator/comparator 546 computes the difference between the PFRIV and RIV and compares the difference to the threshold that is provided on line 534 from the controller/calculator 526. The result of this comparison is provided to the Huffman encoder input controller 538 and to the controller/calculator 526, via line 550.

The fixed-rate to variable-rate controller and distortion calculator 526 has been shown as a single block for purposes of simplicity. The block 526 corresponds to blocks 148 and 158 of FIG. 7, and operates in accordance with blocks 216-231 of the flowchart of FIG. 8B, except that the codebook 140' stores second residual codevectors (SRC's) instead of first residual codevectors. The output of block 526 is a derivative second residual codevector address (DSRCA) which is supplied to an input of the Huffman encoder input controller 538, as shown.

The Huffman encoder input controller 538 also receives as inputs the AMV on a line 552 and the "copy previous frame second residual codevector" instruction 554. The function of the controller 538 is to select the correct one(s) of the various inputs and supply it (them) to the Huffman encoder 168' for Huffman encoding and subsequent insertion into the FIFO buffer 174'. The manner in which these inputs are selected will become evident from the flowcharts of FIG. 16A-16C.

The threshold adjust circuit 180', the FIFO buffer 174' and the Huffman encoder 168' all operate in accordance with the principles previously discussed above.

Referring now to the flowchart of FIGS. 16A and 16B, the operation of the apparatus 500 of FIG. 15 will be described. As shown at step 600 of FIG. 16A, the AMV's and SRCA's obtained from the indications transmitted by the encoder 300 (of FIG. 13) for each input vector of the current frame are stored in the respective memories 508, 504. Thereafter, the obtained SRCA, and the AMV for each input vector, are processed in order as shown in the flowcharts. As shown at step 602, the AMV for a current IV is processed, as before described, to yield the PMV for the current IV as shown at 604. At step 406, the input vector representation reconstructor 520 retrieves the obtained SRCA for the current IV from the memory 504 and bi-directionally communicates with the codebook processor 522 to retrieve the SRC residing at the obtained SRCA from the codebook 140'. The codebook 140' is identical to the codebook 114' of the encoder 300, and therefore the retrieved SRC is identical to the SRC selected at the encoder 300 for the current IV. At step 608, the reconstructor 520 reconstructs a representation of the current IV (RIV) from the AMV, PMV and SRC for the current IV under consideration. The manner in which the RIV is constructed is detailed in FIG. 17 and is described below.

Next, at step 610, the PMV/RIV difference calculator and comparator 532 calculates a measure of difference between the PMV and RIV. The measure of difference is then compared to the threshold, as shown at step 612. If the difference fails to exceed the threshold, control passes to step 614 where the Huffman encoder input controller 538 selects only the AMV and only this AMV is Huffman encoded. Then, the Huffman encoded AMV is inserted into the buffer 174', step 616, the threshold is adjusted, step 618, and the AMV for this current IV is transmitted, step 620. Control would then pass back to step 600 to repeat the process for the obtained SRCA and AMV of the next input vector.

If, at step 612, it is found that the difference between the PMV and RIV exceeds the threshold, then control passes to step 622 as shown in FIG. 16B. At step 622, the previous frame input vector reconstructor 536 retrieves the previous frame second residual codevector address that corresponds to the obtained SRCA and bi-directionally communicates with the codebook processor 522 to retrieve the previous frame second residual codevector (PFSRC) residing at the PFSRCA in the codebook 140'. From the PFSRC and the AMV and PMV of the current IV, the reconstructor 536 constructs a representation of the previous frame input vector (RPFIV) that logically (spatially) corresponds to the current IV. As with the RIV, the manner in which the RPFIV is constructed is detailed in FIG. 17 and is described below. At step 624, the difference between the RIV and the RPFIV is calculated. At step 626, this difference is compared to the threshold. If the difference fails to exceed the threshold, then the controller 538 permits the AMV for the current IV to be Huffman encoded and inserted into the buffer 174', as shown at step 628. Also, the copy previous frame second residual codevector instruction 554 is selected by the controller 538 and inserted into the buffer as shown at steps 630 and 632. Thereafter, the threshold is adjusted and the data is transmitted as shown at steps 634, 636.

If, at step 626, it was determined that the difference exceeded the threshold, then steps 216' through 231' are performed by block 526. Steps 216' through 231' are identical to the corresponding steps 216 through 231 of FIG. 8B, except that the codebook 140' contains second residual codevectors. Accordingly, the result of steps 216' through 231' is a derivative second residual codevector address (DSRCA) that has a length ranging from k to N * k bits and is the address of a parent codevector of the SRC. A detailed description of steps 216' through 231' is not necessary since they are substantially identical to steps 216 through 231 of FIG. 8B.

It should be understood that in this most preferred embodiment, as in the previously described embodiment, calculation of the distortion between retrieved parent codevectors and the SRC (step 222') of FIG. 16C is only valid when the second residual codevectors in the codebooks 114', 140' are all zero-mean codevectors. If such is not the case, then prior to obtaining a measure of difference between the SRC and a parent codevector, the reconstruction method performed by the reconstructors 520, 536 (and illustrated in FIG. 17) would have to be performed on both the SRC and the parent codevector. In this most preferred embodiment, the second residual codevectors stored in the codebooks 114', 140' are zero-mean codevectors, and the reconstruction method need not be performed prior to obtaining a measure of difference. It is understood, however, that the present invention is not limited to codebooks having zero-mean second residual codevectors.

As shown at step 232', the AMV and the DSRCA for the current IV are provided to the Huffman encoder 168' via controller 538 and then inserted into the buffer 174', as shown at step 234'. Thereafter, the threshold is adjusted, step 236', and the data transmitted, step 238'. Control then passes back to step 600 where the method is repeated for the obtained SRCA and AMV of the next input vector.

Thus, according to the method of FIGS. 16A-16C, the actual mean value AMV for each input vector IV is always transmitted, even if a "copy previous frame second residual codevector" instruction or derivative second residual codevector address DSRCA is transmitted. As will become evident hereinafter, this is so because, at the decoder, all AMV's for the current frame are needed to calculate the PMV for each input vector so that the input vector can be reconstructed from either a previous frame second residual codevector (when a copy instruction is transmitted), or a parent second residual codevector (when a DSRCA is transmitted).

A plurality of transmitted AMVs and/or DSRCAs and copy-previous-frame-SRC instructions, represent variable-rate VQ data. Thus, the fixed-rate VQ data transmitted from the encoder 300 of FIG. 13 is transformed to variable-rate VQ data by the transformer 500 of FIG. 15.

Referring now to FIG. 17, there is shown a flowchart illustrating the method used in steps 608 and 622 of FIGS. 8A-8B to reconstruct the RIV and RPFIV, respectively. As shown at step 650, the PMV for the current IV is added to the retrieved SRC (if reconstructing the RIV in step 608) or to the PFSRC (if reconstructing the RPFIV in step 622). The result of step 650 is an intermediate vector (INTV), as shown at step 652. At step 654, the mean value (a scalar quantity, not a vector quantity) of the INTV is calculated. This mean value is referred to in the flowcharts as MVINTV. At step 656, the difference between the just calculated MVINTV and the AMV for the current IV is calculated; this difference defines a mean value", as shown at step 658. At step 660, the mean value" is added to the INTV to yield the RIV (i.e., the representation of the current IV in step 608) or the RPFIV (i.e., the representation of the previous frame IV in step 622), as shown at step 662.

Referring now to FIG. 18, a decoder 700 for use in connection with the fixed-rate to variable-rate transformation method and apparatus of the most preferred embodiment of the present invention is shown. The decoder 700 comprises a Huffman decoder 252' for receiving incoming Huffman data. The decoded data is stored in a buffer 254' which stores two full frames of mean value (AMV) and derivative second residual address (DSRCA) data, as well as copy-previous-frame-second-residual-codevector instructions. As mentioned above, and as described below in greater detail, these two full frames of data are necessary to reconstruct the PMV's for each IV. Thus, the decoder 700 must receive all data for the current frame (and must have the data for the previous frame in the buffer 254') before it may begin processing and decoding the current frame. Once a full frame of data for the current frame has been received, the data associated with each input vector IV thereof may be processed in turn.

The codebook processor 258' retrieves the DSRCA for a current IV under reconstruction. For each received DSRCA, the codebook processor 258' retrieves the corresponding SRC (which as mentioned is either a parent codevector of the SRC selected at the encoder 100 or an identical representation of the SRC selected at the encoder 100) from the codebook 260' and provides it to a summing circuit 708 via line 714. An instruction processor 701 monitors for the occurrence of copy-previous-frame-second-residual-codevector instructions. When such an instruction is encountered, the processor 701 retrieves the derivative address of that previous frame second residual codevector (PFDSRCA) from the buffer 254' and supplies it over line 726 to the codebook processor 258'. The codebook processor then retrieves the corresponding previous frame second residual codevector (PFSRC) from the codebook 260' and supplies it to the summing circuit 708 via line 714. Thus, SRCA and PFSRCA data provided on line 726 are treated identically by the codebook processor 258' although only one or the other will be present at any time. The summing circuit 708 also treats the SRC and PFSRC data on line 714 identically, although only one or the other will be present at any time.

A PMV calculator 702 receives, on a line 728, the AMV for the current IV under consideration, as well as the AMV's for all surrounding IV's. The calculator 702 reconstructs the PMV for the current IV employing this data and supplies the result on line 720 to the summing circuit 708. The summing circuit 708 sums the PMV on line 720 to either the SRC or PFSRC data on line 714 to provide, on line 718, an intermediate vector (INTV). The INTV on line 718 corresponds to the INTV of block 652 of FIG. 17. The INTV is supplied to both a summing circuit 710 and a mean value calculator 704. Calculator 704 calculates the mean value (a scalar quantity) of the INTV and supplies the result (MVINTV) to a MVINTV/AMV difference calculator 706 via a line 730. The calculator 506 calculates the difference between the just calculated MVINTV and the AMV for the current IV. The difference, which is a representation of the mean value' calculated at step 658 of FIG. 17, is supplied to the summing circuit 710 via a line 722. The summing circuit 710 adds the INTV to the mean value'. The result of this summation is a reproduced codevector which is a substantial representation of the current input vector IV. The result is supplied to a D/A converter 264', and the resulting analog data is supplied to an NTSC encoder 266' which places the same in a format suitable for display on a television.

The D/A converter 264' also receives, on a line 724, the PMV for the current IV for reasons which will become evident from FIG. 20.

Alternatively, after the variable-rate VQ data is Huffman decoded by the decoder 252', the decoded data may be provided, via a line 729, to a variable-rate-to-fixed-rate transformer 270'. This would be done, for example, when it is desired to store the received data on magnetic media at the locale of the decoder. To "playback" the stored data, the data would simply be fed from the storage device (e.g., a VCR) to the buffer 254' via a line 731. The decoder 700 would then operate in the same manner as if it was receiving the data from the transformer 500 of FIG. 15.

Referring now to FIGS. 19A-19B, the operation of the decoder 700 of FIG. 18 will be explained in greater detail. As shown in step 800, the incoming Huffman codes are decoded via decoder 252'. At step 278', it is determined whether the decoded data will be immediately processed in accordance with steps 802 et seq. for display on a TV at the locale of the decoder or the decoded data will be stored on magnetic media by, for example, a VCR. If the data is to be immediately processed for display, then the decoded data is stored in the buffer 254' (this step is not shown in FIG. 19A).

As mentioned, data for each corresponding input vector IV is processed in turn, as described below.

At step 802, the occurrence of "copy-previous-frame-second-residual-codevector" instructions is monitored. If such an instruction is encountered, then the PFDSRCA is retrieved from the buffer 254' and the corresponding PFSRC is retrieved from the codebook 260', as shown at step 806. Thereafter, processing resumes at step 810. However, if no such instruction is encountered, then it must be determined whether only an AMV, or both an AMV and DSRCA are present for the current IV (recall that this is done by examining the AMV for an appended code indicating that the AMV only was transmitted). If it is determined at step 804 that there is no DSRCA for the current IV, then, at step 628, the AMV is retrieved from the buffer 254', and the PMV is calculated as shown at step 830. In such cases, the PMV itself is utilized as the reproduced version of the input vector IV, as shown at step 832.

If a DSRCA was detected at step 808, then the SRC residing at the DSRCA is retrieved from the codebook 260' as shown at step 808. Thereafter, the corresponding AMV is retrieved from the buffer 254' as shown at step 810, and the PMV is calculated at step 812. At step 814, the PMV is added to either the PFSRC or the SRC (whichever was provided to the summing circuit 708) to yield the intermediate vector INTV, step 816. At step 818, the mean value (a scalar quantity) of the INTV is calculated. In the flowchart of FIG. 19A, this mean value is referred to as MVINTV.

At step 820, the difference between the just calculated MVINTV and the AMV for the current IV is calculated. As shown at 822, this difference defines a substantial reproduction of the mean value" calculated at step 658 of FIG. 17. At step 824, the mean value' is added to the INTV to provide a reproduced codevector which is a substantial representation of the current input vector IV.

The D/A converter 264' converts either the PMV, from step 832, or the reproduced codevector, from step 826, to analog form, as shown at step 293'. The analog data is NTSC encoded, step 294', and then displayed at step 295'.

If at step 278', it is determined that the decoded variable-rate VQ data is to be stored on magnetic media by, for example, a VCR, then control passes to step 296' as best shown in FIG. 19B. At step 296', the variable-rate VQ data is transformed to fixed-rate VQ data. Then, in step 297', the fixed-rate VQ data is stored on the magnetic media. As shown at step 298', if it is desired to view the stored data, the fixed-rate VQ data is supplied to the buffer 254' via line 731 and control passes to step 802. Steps 802 through 295' are then repeated for the stored data.

In FIGS. 11, 12, 19 and 20, the reproduced image vector is shown as being supplied directly to the D/A converter 264, 264'. However, this illustration is simplified and is for purposes of expediency only. Those skilled in the art will readily appreciate that a full scan line will need to be obtained, i.e., from several sequential image vectors, for the NTSC encoder to trace a line of the image on the display or recording device. This may be performed by employing a small buffer to store those sequential image vectors needed to construct a scan line. An alternative method of retrieving a scan line is disclosed in co-pending patent application Ser. No. 794,487, entitled "Method and Apparatus for Low Frequency Removal in Vector Quantization."

The invention has been described above as being carried out in the spatial domain, i.e., the codevectors (first residual or second residual) stored in the codebook are representative of the spatial placement of the pixels in each sub-image, and the input vectors (or residuals thereof) used to search the codebook are representative of the spatial placement of an actual group of pixels. However, the invention is not limited to implementation in the spatial domain. The invention may also be carried out in the transform, or frequency, domain wherein, instead of storing spatial codevectors as above described, their transforms are calculated and transformed codevectors are stored in the codebook. For example, each codevector would replaced by its cosine (Fourier) transform, and each input vector (or residual thereof) would be transformed prior to searching the codebook. In this case, the codebook would still be constructed as described in the above mentioned Linde et al. reference, but entries would be based upon a distance metric (e.g., mean square error) in the transformed vector space. Thus, in the encoder, the tree-search (or full-search if the codebook contains only the last level of a tree-structured codebook) would be carried out in the transform domain. Similarly, in the fixed-rate-to-variable-rate transformer, the codebook would contain transform codevectors. However, the decoder could remain unchanged. The decoder codebook would continue to operate in the spatial domain. The advantage of this approach is that it is believed that it would result in fewer "block" artifacts commonly found in VQ encoder/decoder schemes.

The present invention may be employed in other specific forms without departing from the spirit or essential attributes thereof and, accordingly, reference should be made to the appended claims rather than to the foregoing specification, as indicating the scope of the invention.

We claim:

1. A method comprising the steps of:
   transmitting fixed-rate vector quantized data from a first location to a second location via a first medium;
   receiving the fixed-rate vector quantized data at the second location and transforming the fixed-rate vector quantized data to variable-rate vector quantized data; and
   transmitting the variable-rate vector quantized data from the second location to a third location via a second medium.

2. Method according to claim 1 wherein the first location is a transmitter location of television signals, and the second location is a cable-head end, and the third location is a receiver location of television signals, and wherein the first medium is a satellite communications link and the second medium is a cable television distribution system.

3. Method according to claim 1 further comprising the steps of:
   a) receiving the variable-rate vector quantized data at the third location; and
   b) transforming the variable-rate vector quantized data to fixed-rate vector quantized data at the third location for storage on magnetic media at the third location.

4. Method of communicating image data from a transmitter location of television signals to at least one reception site, comprising the steps of:
   a) receiving image data to be transmitted, and converting the image data to a plurality of multidimensional input vectors;
   b) providing at the transmitter location, a vector quantization encoder of the type that employs a first tree structured codebook to vector quantize the input vectors and sequentially transmits vector quantized data for each of the input vectors, the first codebook having a plurality N of levels of codevectors, each codevector being representative of a possible input vector, the codevectors at each successive level representing possible input vectors with greater accuracy than codevectors at a preceding level, there being an address associated with each codevector having a length corresponding to the level of the codevector in the codebook, the addresses of codevectors at a same level having a same length and the lengths increasing with each successive level;
   c) processing a one of the input vectors and selecting from the Nth level a codevector that most closely resembles the processed input vector, the address of the selected codevector having a length of M bits;
   d) transmitting to an intermediate location via a first medium, an indication of at least the M bit address associated with the selected codevector;
   e) repeating steps (c) and (d) for each other input vector, a plurality of the indications transmitted in step (d) representing fixed-rate vector quantized data;
   f) performing the following steps at the intermediate location:
      f1) receiving each indication transmitted in step (d) and obtaining the M bit addresses therefrom;
      f2) transforming each M bit address to a derivative address having a length ranging from 1 to M bits and transmitting an indication of the derivative address to at least one reception site, a plurality of the transmitted derivative address indications representing variable-rate vector quantized data.

5. Method according to claim 4 wherein the intermediate location is a cable-head end, and wherein the first medium is a satellite communications link and the second medium is a cable television distribution network.

6. Method according to claim 4 wherein another tree structured vector quantization codebook substantially identical to the first codebook is provided at the reception site and wherein the following steps are performed at the reception site:
   receiving each transmitted indication from the intermediate location and obtaining the derivative address therefrom, and for each obtained derivative address:
      i) retrieving from the codebook at the reception site the codevector residing at the obtained derivative address to obtain at least a substantial representation of an associated codevector selected in step (c) from the first codebook, and, from the retrieved codevector, reproducing a representation of the input vector for which the associated codevector was selected in step (c);
      ii) employing the reproduced representation of the input vector to substantially recreate the image data the reception site for display on a television set located at the reception site.

7. Method according to claim 4 wherein the codevectors in the first codebook are representative of possible second residual vectors.

8. Method according to claim 4 wherein the following steps are performed at the reception site:
   a') receiving each transmitted indication from the intermediate location and obtaining the derivative address therefrom, the obtained derivative addresses having variable lengths ranging from 1 to M;
   b') transforming each derivative address to an address having a length of S bits, all the derivative addresses being S bits in length; and
   c') storing at least an indication of each transformed derivative address on a magnetic medium at the locale of the reception site, a plurality of the transformed derivative addresses representing fixed-rate vector quantized data.

9. Method according to claim 8 wherein S is equal to M.

10. Method according to claim 4 wherein step (c) comprises determining a mean value of the input vector and removing the mean value from the input vector to obtain a residual vector, the processed input vector comprising the residual vector.

11. Method according to claim 10 wherein step (d) further comprises transmitting the mean value with the indication.

12. Method according to claim 4 wherein a mean value of each input vector is determined and a mean vector for a current input vector is interpolated from the mean value of the current input vector and any adjacent vectors and wherein step (c) comprises subtracting the mean vector from the current input vector.

13. Method according to claim 12 wherein the result of the subtraction defines a first residual vector and step (c) further comprises calculating a mean value of the first residual vector and subtracting the mean value of the first residual vector from the first residual vector to define a second residual vector, the processed input vector comprising the second residual vector.

14. Method according to claim 4 wherein a second tree structured vector quantization codebook substantially identical to the first codebook is provided at the intermediate location and wherein step (f2) comprises:
for each obtained M bit address:
i) retrieving from the Nth level of the second codebook the codevector residing at the obtained M bit address to obtain a substantially identical representation of an associated codevector selected from the first codebook in step (c);
ii) selecting an initial level of the codebook and defining a currently selected level thereof as the initial level;
iii) selecting a portion of the obtained M bit address, the selected portion having an address length ranging from 1 to (M−1) and being suitable for addressing a codevector in the currently selected level of the second codebook, and defining a current codevector address as the selected portion;
iv) retrieving from the currently selected level of the second codebook the codevector residing at the current codevector address;
v) obtaining a measure of difference between the codevector retrieved in step (i) and the codevector retrieved in step (iv);
vi) proceeding to step (ix) only if the measure of difference is not greater than a threshold value, but otherwise selecting a next level of the second codebook succeeding the currently selected level and redefining the currently selected level as the next level and proceeding to step (vii);
vii) proceeding to step (viii) if the currently selected level is a last level of the codebook, but otherwise selecting another portion of the obtained M bit address, the selected portion having an address length ranging from 1 to (M−1) and being suitable for addressing a codevector in the currently selected level, and redefining the current codevector address as said another selected portion and repeating steps (iv) through (vi);
viii) redefining the current codevector address as the obtained M bit address and proceeding to step (ix);
ix) defining the derivative address as the current codevector address, the derivative address having a length ranging from 1 to M bits, and transmitting an indication of at least the derivative address.

15. Method according to claim 14 wherein M is equal to N.

16. Method according to claim 14 wherein M is equal to N multiplied by k, where k is a function of the tree structure of the fist codebook.

17. Method according to claim 14 further comprising the step of periodically adjusting the threshold value based upon an average length of data transmitted in step (ix).

18. Method according to claim 14 wherein a compression code is assigned to each derivative address, each compression code having a length that is substantially inversely proportional to a predetermined probability that a particular codevector will be selected in step (c), and wherein step (f2) comprises transmitting the compression code for each derivative address.

19. Method according to claim 18 wherein the compression codes are Huffman codes.

20. Method according to claim 14 further comprising the step of storing the indications of the derivative addresses to be transmitted in a buffer, periodically obtaining a measure of unused capacity of the buffer, and periodically and automatically adjusting the threshold value based upon the measure of unused capacity of the buffer.

21. Method according to claim 20 wherein the threshold value is adjusted by increasing the threshold value when the measure indicates that unused buffer capacity is decreasing and decreasing the threshold value when the measure indicates that unused buffer capacity is increasing, adjustment of the threshold value ensuring that the buffer does not empty or overflow.

22. Method according to claim 14 wherein prior to performing step (ii), the following steps are performed:
a') comparing a representation of a previous input vector, which previous input vector has already been vector quantized into fixed-rate vector quantized data at the encoder and transformed to variable-rate vector quantized data at the intermediate location and transmitted to the reception site, to a representation of a current input vector to obtain a measure of difference between the previous input vector and the current input vector; and
b') transmitting to the reception sites an instruction to reconstruct a substantial representation of the current input vector from the variable-rate vector quantized data already transmitted for the previous input vector only when the measure of difference between the previous input vector and the current input vector is not greater than the threshold, but otherwise performing steps (ii) through (ix);
whereby variable-rate vector quantized data for the current input vector need not be transmitted to reconstruct a representation of the current input vector at the reception site when the measure of difference between the previous input vector and the current input vector is not greater than the threshold value.

23. Method according to claim 22 wherein another tree structured vector quantization codebook substantially identical to the first codebook is provided at the reception site and wherein the following steps are performed at the reception site:
f1) for indications received at the reception site, obtaining the derivative address therefrom, retrieving from the codebook at the reception site the codevector residing at the obtained derivative address to obtain at least a substantial representation of an associated codevector selected in step (c) from the first codebook, and employing the retrieved codevector to substantially reproduce the input vector for which the associated codevector was selected from the first codebook in step (c);
f2) for instructions that are received at the reception site, obtaining from a memory at the reception site a previously obtained derivative address, retrieving from the codebook at the reception site the codevector residing at the previously obtained derivative address, and reproducing from the retrieved codevector a substantial representation of the current input vector that resulted in the transmission of the instruction;

f3) employing the reproduced representations of the input vectors to substantially recreate the image data at the reception site for display on a television set located at the reception site.

24. Method of communicating image data from a transmitter location of television signals to a plurality of reception sites, comprising the steps of:

a) receiving image data to be transmitted, and converting the image data to a plurality of multi-dimensional input vectors;

b) providing at the transmitter location, a vector quantization encoder of the type that employs a first tree structured codebook to vector quantize the input vectors and sequentially transmits vector quantized data for each of the input vectors, the first codebook having a plurality N of levels of codevectors, each codevector being representative of a possible input vector, the codevectors at each successive level representing possible input vectors with greater accuracy than codevectors at a preceding level, there being an address associated with each codevector having a length equal to L * k bits where L represents the level of the codevector in the codebook and has a value ranging from 1 to N, and where k is a function of the tree structure of the codebook, at least a portion of the address of a codevector at a given level L' of the codebook being capable of addressing a codevector at a given level P preceding level L';

c) processing a one of the input vectors and selecting from the Nth level a codevector that most closely resembles the processed input vector, the address of the selected codevector having a length equal to N * k bits;

d) transmitting to an intermediate location via a first medium, an indication of at least the N * k bit address associated with the selected codevector;

e) repeating steps (c) and (d) for each other input vector, a plurality of the indications transmitted in step (d) representing fixed-rate vector quantized data;

f) performing the following steps at the intermediate location, there being a second tree structured vector quantization codebook at the intermediate location, the second codebook being substantially identical to the first codebook:

f1) receiving a one of the indications from the transmitter location and obtaining the N * k bit address therefrom;

f2) retrieving from the Nth level of the second codebook the codevector residing at the obtained N * k bit address to obtain a substantially identical representation of an associated codevector selected from the first codebook in step (c);

f3) selecting an initial level of the second codebook preceding the Nth level and defining a currently selected level as the initial level and defining a value CL that identifies the currently selected level;

f4) selecting the CL * k most significant bits of the obtained N * k bit address, and defining a current codevector address as the selected CL * k bits;

f5) retrieving from the currently selected level of the second codebook the codevector residing at the current codevector address;

f6) obtaining a measure of difference between the codevector retrieved in step (f1) and the codevector retrieved in step (f5);

f7) proceeding to step (f10) only if the measure of difference is not greater than a threshold value, but otherwise selecting a next level of the second codebook succeeding the currently selected level and redefining the currently selected level as the next level, the value CL being modified to identify the currently selected level, and proceeding to step (f8);

f8) proceeding to step (f9) if the currently selected level is a last level of the second codebook, but otherwise selecting the CL * k most significant bits of the N * k bit address, and redefining the current codevector address as the selected CL * k bits, and repeating steps (f5) through (f7);

f9) redefining the current codevector address as the obtained N * k bit address and proceeding to step (f10);

f10) defining a derivative address as the current codevector address, the derivative address having a length ranging from k to N * k bits, and transmitting an indication of at least the derivative address to at least one reception site;

f11) repeating steps (f1) through (f10) for each other indication transmitted from the transmitter location in step (d), a plurality of the indications of the derivative addresses transmitted in step (f10) representing variable-rate vector quantized data.

25. Method according to claim 24 wherein the intermediate location is a cable-head end, and wherein the first medium is a satellite communications link and the second medium is a cable television distribution network.

26. Method according to claim 24 further comprising the step of periodically adjusting the threshold value based upon an average length of data transmitted in step (f10).

27. Method according to claim 24 wherein another tree structured vector quantization codebook substantially identical to the first codebook and the second codebook is provided at the reception site and wherein the following steps are performed at the reception site:

receiving each transmitted indication from the intermediate location and obtaining the derivative address therefrom, and for each obtained derivative address;

i) retrieving from the codebook at the reception site the codevector residing at the obtained derivative address to obtain at least a substantial representation of an associated codevector selected from the first codebook in step (c), and, from the retrieved codevector, reproducing a representation of the input vector for which the associated codevector was selected from the first codebook in step (c);

ii) employing the reproduced representation of the input vector to substantially re-create the image data at the reception site for display on a television set located at the reception site.

28. Method according to claim 24 wherein a compression code is assigned to each derivative address, each compression code having a length that is substantially inversely proportional to a predetermined probability that a particular codevector will be selected in step (c), and wherein step (f10) comprises transmitting the compression code for each derivative address.

29. Method according to claim 28 wherein the compression codes are Huffman codes.

30. Method according to claim 24 further comprising the step of temporarily storing the indications of the derivative addresses in a buffer prior to transmitting, periodically obtaining a measure of unused capacity of the buffer, and periodically and automatically adjusting the threshold value based upon the measure of unused capacity of the buffer.

31. Method according to claim 30 wherein the threshold value is adjusted by increasing the threshold value when the measure indicates that unused buffer capacity is decreasing and decreasing the threshold value when the measure indicates that unused buffer capacity is increasing, adjustment of the threshold value ensuring that the buffer does not empty or overflow.

32. Method according to claim 24 wherein the following steps are performed at the reception site:
 a') receiving each transmitted indication from the intermediate location and obtaining the derivative address therefrom, the obtained derivative addresses having variable lengths ranging from k to N * k;
 b') transforming each derivative address to an address having a length of S bits, all the transformed derivative addresses being S in length; and
 c') storing at least an indication of each transformed derivative address on a magnetic medium at the locale of the reception site, a plurality of the transformed derivative addresses representing fixed-rate vector quantized data.

33. Method according to claim 32 wherein S is equal to N * k.

34. Method according to claim 24 wherein step (c) comprises determining a mean value of the input vector and removing the mean value from the input vector to obtain a residual vector, the processed input vector comprising the residual vector.

35. Method according to claim 34 wherein step (d) further comprises transmitting the mean value with the indication.

36. Method according to claim 24 wherein prior to performing step (f3), the following steps are performed:
 a') comparing a representation of a previous input vector, which previous input vector has already been vector quantized into fixed-rate data at the transmitter location and transformed to variable-rate data at the intermediate location and transmitted to at least one reception site, to a representation of a current input vector to obtain a measure of difference between the previous input vector and the current input vector; and
 b') transmitting to the reception site an instruction to reconstruct a substantial representation of the current input vector from the variable-rate data already received at the reception site for the previous input vector only when the measure of difference between the previous input vector and the current input vector is not greater than the threshold, but otherwise performing steps (f3) through (f10);
 whereby variable-rate vector quantized data for the current input vector need not be transmitted to reconstruct a representation of the current input vector at the reception site when the measure of difference between the previous input vector and the current input vector is not greater than the threshold value.

37. Method according to claim 36 wherein another tree structured vector quantization codebook substantially identical to the first codebook is provided at the reception site and wherein the following steps are performed at the reception site:
 i) for indications that are received at the reception site, obtaining the derivative address therefrom, retrieving from the codebook at the reception site the codevector residing at the obtained derivative address to obtain at least a substantial representation of an associated codevector selected from the first codebook in step (c), and employing the retrieved codevector to substantially reproduce the input vector for which the codevector was selected from the first codebook in step (c);
 ii) for instructions that are received at the reception site, obtaining from a memory at the reception site a previously obtained derivative address, retrieving from the codebook at the reception site the codevector residing at the previously obtained derivative address, and reproducing from the retrieved codevector a substantial representation of the input vector that resulted in the transmission of the instruction;
 iii) employing the reproduced representations of the input vectors to substantially recreate the image data at the reception site for display on a television set located at the reception site.

38. Method according to claim 24 wherein a mean value of each input vector is determined and a mean vector for a current input vector is interpolated from the mean value of the current input vector and any adjacent vectors and wherein step (c) comprises subtracting the mean vector from the current input vector.

39. Method according to claim 38 wherein the result of the subtraction defines a first residual vector and step (c) further comprises calculating a mean value of the first residual vector and subtracting the mean value of the first residual vector from the first residual vector to define a second residual vector, the processed input vector comprising the second residual vector.

40. Method according to claim 39 wherein the codevectors in the codebook are representative of possible second residual vectors.

41. Method of transforming fixed-rate vector quantized data to variable-rate vector quantized data wherein the fixed-rate vector quantized data comprises a plurality of M bit codevector addresses, each M bit address being associated with a codevector selected from an Nth level of a first tree structured vector quantization codebook, comprising the steps of:
 for each M bit address:
 i) retrieving from the Nth level of a second codebook that is substantially identical to the first codebook the codevector residing at the M bit address to obtain a representation of the codevector selected from the M bit address of the Nth level of the first codebook;
 ii) selecting an initial level of the second codebook preceding the Nth level and defining a currently selected level as the initial level;
 iii) selecting a portion of the M bit address, the selected portion having an address length ranging from 1 to (M−1) bits and being suitable for addressing a codevector in the currently selected level of the second codebook, and defining a current codevector address as the selected portion;

iv) retrieving from the currently selected level of the second codebook the codevector residing at the current codevector address;

v) obtaining a measure of difference between the codevector retrieved in step (i) and the codevector retrieved in step (iv);

vi) proceeding to step (ix) only if the measure of difference is not greater than a threshold value, but otherwise selecting a next level of the second codebook succeeding the currently selected level and redefining the currently selected level as the next level and proceeding to step (vii);

vii) proceeding to step (viii) if the currently selected level is a last level of the codebook, but otherwise selecting another portion of the M bit address, said selected another portion having an address length ranging from 1 to (M−1) bits and being suitable for addressing a codevector in the currently selected level, and redefining the current codevector address as the selected portion and repeating steps (iv) through (vi);

viii) redefining the current codevector address as the M bit address and proceeding to step (ix);

ix) defining a derivative address as the current codevector address, the derivative address having a length ranging from 1 to M bits, a plurality of the derivative addresses representing variable-rate vector quantized data.

42. Method according to claim 41 wherein M is equal to N.

43. Method according to claim 41 wherein M is equal N multiplied by k, where k is a function of the tree structure of the first codebook.

44. An apparatus for transforming fixed rate vector quantized data to variable rate vector quantized data for use by operators of a television signal distribution system employing, at a transmitter location thereof, a tree search vector quantization data compressor for compressing input vectors and having a first codebook having a plurality N of levels of codevectors each representative of a possible input vector, there being an address associated with each codevector, the transmitter location transmitting for each input vector an indication of the associated address of a codevector selected from the Nth level of the first codebook that most closely resembles the input vector, the associated addresses of the selected codevectors each having a length of M bits, a plurality of the indications of the associated addresses representing fixed-rate vector quantized data, the apparatus comprising:

first means for receiving each indication transmitted from the transmitter location and for obtaining the M bit address therefrom;

second means for transforming the obtained M bit address to a derivative address having a length ranging from 1 to M bits; and transmitter means for transmitting at least an indication of the derivative address, a plurality of transmitted indications of derivative addresses representing variable-rate vector quantized data.

45. Apparatus according to claim 44 wherein the second means for transforming the obtained M bit address to a derivative address having a length ranging from 1 to M bits comprises:

a second codebook being substantially identical to the first codebook;

third means for retrieving from the Nth level of the second codebook a first codevector residing at the obtained M bit address;

a controller for selecting at least a portion of the obtained M bit address, the selected portion representing an intermediate address and having a length ranging from 1 to (M−1) bits, and for retrieving from the second codebook a second codevector residing at the intermediate address, and for obtaining a measure of difference between the first codevector and the second codevector, and for selecting another portion of the obtained M bit address only if the measure of difference is not greater than a threshold value, a finally selected portion of the obtained M bit address representing the derivative address.

46. Apparatus according to claim 45 further comprising a lossless compression encoder for assigning a compression code to each derivative address, the compression code having a length that is substantially inversely proportional to a probability that a particular derivative address will be selected, the transmitted indications of the derivative addresses comprising the compression codes.

47. Apparatus according to claim 45 further comprising means for obtaining a measure of difference between a codevector currently retrieved by the third means and a codevector previously retrieved by the third means and for providing, based upon the measure of difference and the threshold value, an indication that the currently retrieved codevector is substantially similar to the previously retrieved codevector and may be copied therefrom.

48. Apparatus according to claim 45 further comprising fourth means for temporarily storing the indications of the derivative addresses prior to being transmitted by the transmitter means and for periodically adjusting the threshold value based upon a measure of unused capacity of the fourth means.

49. Apparatus according to claim 48 further comprising a feedback loop coupling the fourth means to the controller for supplying the threshold value.

50. A decoder for use by recipients of television signals employing, at a transmitter thereof, a vector quantization data compressor for compressing input vectors representative of image data to be communicated to the recipients, and having a first codebook having plural levels of codevectors representative of possible input vectors, there being an address associated with each codevector, the transmitter transmitting variable-rate vector quantized data comprising data indicative of the addresses of codevectors selected from the first codebook that most closely resemble the input vectors, the addresses of the selected codevectors having variable lengths, the decoder comprising:

a second codebook being substantially identical to the first codebook;

first means for receiving the variable-rate vector quantized data and for obtaining the variable length addresses therefrom;

second means for retrieving from the second codebook the codevector residing at each obtained address;

converter means for converting the retrieved codevectors to NTSC image data and for providing the NTSC image data at an output thereof for substantially reproducing images input to the transmitter; and, transformer means for optionally transforming the variable-rate vector quantized data received by the first means to fixed-rate vector quantized data when it is desired to store vector quantized image data on magnetic media in the vicinity of the decoder.

51. Decoder according to claim 50 wherein the transformer means comprises means for transforming each of the variable length addresses to a same pre-determined length, all the transformed addresses having the same predetermined length, at least a plurality of the transformed addresses representing fixed-rate vector quantized data.

52. Method according to claim 4, 24 or 41 wherein the codevectors are transformed to a transform domain before being provided in the codebooks, and the codevectors are stored in the codebooks in the transform domain, and wherein each input vector is transformed to the transform domain for selecting one of the codevectors from the codebook.

53. Method according to claim 52 wherein the transform domain is the frequency domain and the codevectors and input vectors are transformed to the frequency domain by a Fourier transform.

* * * * *